(12) United States Patent
Ohashi

(10) Patent No.: US 7,672,066 B2
(45) Date of Patent: Mar. 2, 2010

(54) ZOOM LENS CAMERA AND PERSONAL DIGITAL ASSISTANT DEVICE

(75) Inventor: Kazuyasu Ohashi, Funabashi (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 12/234,757

(22) Filed: Sep. 22, 2008

(65) Prior Publication Data

US 2009/0080088 A1 Mar. 26, 2009

(30) Foreign Application Priority Data

Sep. 25, 2007 (JP) ............................. 2007-248243
Nov. 9, 2007 (JP) ............................. 2007-292147

(51) Int. Cl.
G02B 9/34 (2006.01)
(52) U.S. Cl. ........................ 359/774; 359/676; 359/687; 359/708
(58) Field of Classification Search .................. 359/676, 359/687, 708, 774
See application file for complete search history.

(56) References Cited

U.S. PATENT DOCUMENTS

| | | | |
|---|---|---|---|
| 5,153,779 A | 10/1992 | Ohashi | |
| 5,398,135 A | 3/1995 | Ohashi | |
| 5,576,891 A | 11/1996 | Ohashi | |
| 5,581,319 A | 12/1996 | Ohashi | |
| 5,617,254 A | 4/1997 | Ohashi | |
| 5,630,188 A | 5/1997 | Ohashi | |
| 5,687,401 A | 11/1997 | Kawamura et al. | |
| 5,930,056 A | 7/1999 | Ohashi | |
| 6,353,506 B1 | 3/2002 | Ohashi | |
| 6,404,561 B1 | 6/2002 | Isono et al. | |
| 6,525,885 B2 | 2/2003 | Ohashi | |
| 6,747,818 B2 | 6/2004 | Ohashi et al. | |
| 6,771,433 B2 | 8/2004 | Ohashi | |
| 6,829,102 B2 | 12/2004 | Ohashi et al. | |
| 6,839,183 B2 | 1/2005 | Ohashi | |
| 6,839,185 B2 | 1/2005 | Ohashi | |
| 6,995,921 B2 | 2/2006 | Ohashi | |
| 7,038,858 B2 | 5/2006 | Ohashi | |
| 7,061,686 B2 | 6/2006 | Ohtake | |
| 7,095,564 B2 | 8/2006 | Ohashi | |
| 7,151,638 B2 | 12/2006 | Ohashi | |
| 7,164,542 B2 | 1/2007 | Ohashi | |
| 7,167,320 B2 | 1/2007 | Ohashi | |
| 7,215,485 B2 * | 5/2007 | Hirose | ........................ 359/687 |
| 7,304,803 B2 | 12/2007 | Ohashi | |
| 7,379,249 B2 | 5/2008 | Ohashi | |
| 2005/0094002 A1 | 5/2005 | Ohashi | |
| 2006/0262422 A1 | 11/2006 | Ohashi | |

(Continued)

FOREIGN PATENT DOCUMENTS

JP 08-248317 9/1996

(Continued)

*Primary Examiner*—Joseph Martinez
(74) *Attorney, Agent, or Firm*—Dickstein Shapiro LLP

(57) ABSTRACT

A zoom lens includes, in order from an object to an image, a first lens group having positive refractive power, a second lens group having negative refractive power, a third lens group having positive refractive power, and a fourth lens group having positive refractive power, when varying a field angle from a wide-angle end to a telephoto end, the first lens group and the third lens group being moved to be located on the object side at the telephoto end rather than at the wide-angle end such that a distance between the first lens group and the second lens group increases, a distance between the second lens group and the third lens group decreases, and a distance between the third lens group and the fourth lens group increases.

12 Claims, 22 Drawing Sheets

U.S. PATENT DOCUMENTS

| | | |
|---|---|---|
| 2007/0297068 A1 | 12/2007 | Ohashi |
| 2008/0106799 A1 | 5/2008 | Ohashi |
| 2008/0151385 A1 | 6/2008 | Ohashi |

FOREIGN PATENT DOCUMENTS

| | | |
|---|---|---|
| JP | 2001-21803 | 1/2001 |
| JP | 3391342 B | 3/2003 |
| JP | 2004-212616 | 7/2004 |
| JP | 2006-337592 | 12/2006 |

* cited by examiner

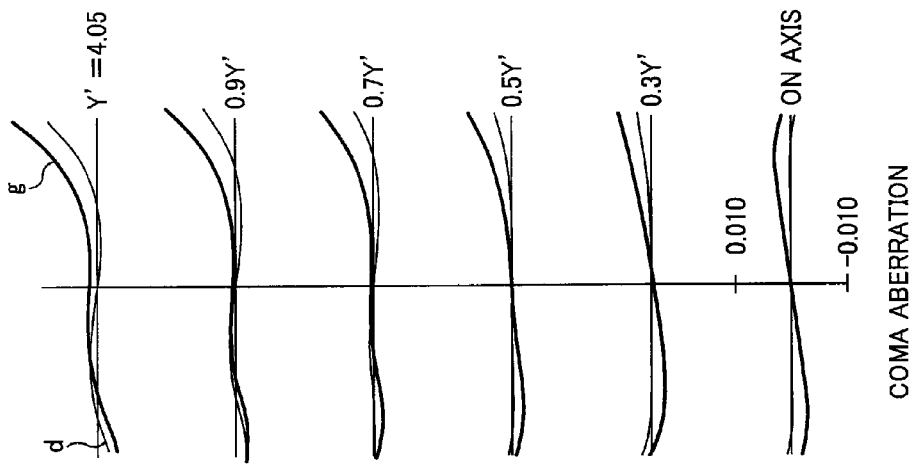
FIG. 16
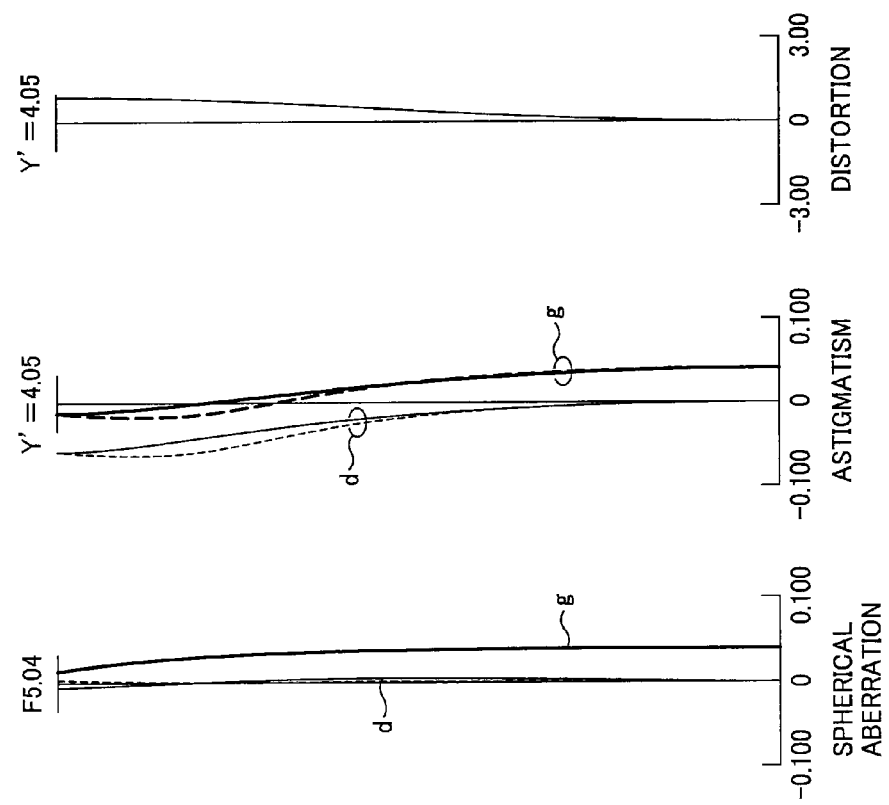

ZOOM LENS CAMERA AND PERSONAL DIGITAL ASSISTANT DEVICE

PRIORITY CLAIM

The present application is based on and claims priority from Japanese Patent Applications No. 2007-248243, filed on Sep. 25, 2007, and No. 2007-292147, filed on Nov. 9, 2007, the disclosures of which are hereby incorporated by reference in their entirety.

BACKGROUND OF THE INVENTION

1. Field of the Invention

The present invention relates to a zoom lens, a camera and a personal digital assistant device using the zoom lens.

2. Description of the Related Art

Since the market for digital cameras has been increasing, users have a wide variety of demands relative to digital cameras. Among the demands, especially, the demands of high quality and downsizing have been increasing. Accordingly, it is required for a zoom lens for use as an imaging lens to achieve both of a high performance and downsizing.

In this case, as for the downsizing, it is necessary to reduce the entire length (a distance from a face of a lens closest to an object side to a face of a lens closest to an imaging face) of lenses when the zoom lens is used. It is also important to reduce the thickness of each lens group, so as to control the entire length of the lenses when the zoom lens is housed. Moreover, as for the high performance, it is necessary to have a resolution corresponding to at least an imaging element of 7 to 10 million pixels In all zooming areas.

Moreover, many users desire a photographing lens having a wide-angle, and it is desirable for a half field angle of a wide-angle end of a zoom lens to be 38 degrees or more. The half field angle of 38 degrees corresponds to 28 mm in a focal length of a 35 mm silver salt camera (so-called Leica).

Furthermore, many users desire a photographing lens having a large variable magnification. If the zoom lens corresponds to about 28 to 200 mm (about 7.1 times) in a focal length of the 35 mm silver salt camera, almost every general photographing can be conducted.

There are many kinds of zoom lenses for use in digital cameras. As a type suitable for a high variable magnification, there is a zoom lens which includes, in order from an object side, a first lens group having a positive focal length, a second lens group having a negative focal length, a third lens group having a positive focal length, and a fourth lens group having a positive focal length. In such a zoom lens, when varying a magnification from a wide-angle end to a telephoto end, the distance between the first lens group and the second lens group increases, the distance between the second lens group and the third lens group decreases, and the distance between the third lens group and the fourth lens group is changed.

As a conventional zoom lens of this type, there is a zoom lens in which when varying a magnification, a first lens group is fixed or a first lens group reciprocates in convex arc on an image side. In this case, if large displacement of the second lens group, which shears a variable magnification function, is ensured, the aperture stop disposed near the third lens group moves away from the first lens group even at the wide-angle end, resulting in the increase in the size of the first lens group for obtaining a wide-angle and a high variable magnification. Accordingly, in order to achieve a wide-angle, a high variable magnification and a downsized zoom lens, it is desirable for the first lens group to move to the object side when varying a magnification from the wide-angle end to the telephoto end.

By reducing the entire length of the lenses at the wide-angle end compared to that at the telephoto end, a sufficient wide-angle can be obtained while controlling the size of the first lens group.

On the other hand, it is known that the use of an anomalous dispersion lens is effective for correcting chromatic aberrations associated with a high variable magnification, a long focal length and a wide-angle. A conventional example using the anomalous dispersion lens for a zoom lens, which includes, in order from an object side, a first lens group having positive refractive power, a second lens group having negative refractive power, a third lens group having positive refractive power, and a fourth lens group having positive refractive power is disclosed in JP H08-248317A, JP2001-021803A, and JP3391342B. In such a zoom lens, when varying a magnification from the wide-angle end to the telephoto end, the distance between the first lens group and the second lens group increases, the distance between the second lens group and the third lens group decreases, and the distance between the third lens group and the fourth lens group is changed.

In addition, JP2004-212616A and JP2006-337592A disclose a zoom lens, which includes, in order from an object side to an image side, a first lens group having positive refractive power, a second lens group having negative refractive power, a third lens group having positive refractive power, and a fourth lens group having positive refractive power. In such a zoom lens, when varying a magnification from the wide-angle end to the telephoto end, at least the first lens group and the third lens group move to the object side such that the distance between the first lens group and the second lens group increases, the distance between the second lens group and the third lens group decreases, the distance between the third lens group and the fourth lens group increases.

However, since the zoom lens disclosed in JP H08-248317A has the first lens group which is fixed when varying a magnification, a wide-angle is not achieved in which the half field angle at the wide-angle end is only 25 degrees. Moreover, in the zoom lens disclosed in JP2001-021803A, the aberrations are corrected by using an aspherical surface for the first lens group. However, since the zoom lens disclosed in JP2001-021803A also has the first lens group which is fixed when varying a magnification, the half field angle at the wide-angle end is only 29 degrees. Furthermore, although the zoom lens disclosed in JP3391342B has the first lens group which is moved to the object side when varying a magnification from the wide-angle end to the telephoto end, the half field angle of the wide-angle end is only about 29-32 degrees, which is insufficient for achieving a wide-angle, in the embodiments (embodiments 1, 2, 6) describing a four group structure of positive, negative, positive, and positive.

In addition, the variable focal length lens system described in JP2004-212616A has a half field angle of about 34-37 degrees at the wide-angle end, but the lens has a variable magnification of 4 times at a maximum, which needs improvement in the variable magnification.

Moreover, the zoom lens disclosed in JP2006-337592A has a sufficient wide-angle in which the half field angle is 38 degrees or more, and also has a variable magnification of 4.5 times or more, but the lens has resolution corresponding to an imaging element of about 4 to 8 million pixels, which needs further improvement in the resolution.

SUMMARY OF THE INVENTION

The present invention has been made in view of the above problems, and an object of the present invention is to provide a downsized zoom lens having a sufficient wide angle whose half field angle is 38 degrees or more at a wide-angle end, a variable magnification of 6.5 times or more, a small number of lenses (about 10 lenses), and a resolution corresponding to 7-10 million pixels, and a camera and a personal digital assistant device using the zoom lens.

In order to achieve the above object, a first aspect of the present invention relates to a zoom lens, including, in order from an object to an image: a first lens group having positive refractive power; a second lens group having negative refractive power; a third lens group having positive refractive power; and a fourth lens group having positive refractive power; when varying a field angle from a wide-angle end to a telephoto end, the first lens group and the third lens group being moved to be located on the object side at the telephoto end rather than the wide-angle end such that a distance between the first lens group and the second lens group increases, a distance between the second lens group and the third lens group decreases, a distance between the third lens group and the fourth lens group increases, the first lens group including one negative lens and two positive lenses, at least one of the negative lens and the two positive lenses of the first lens group including an aspherical surface, and the first lens group satisfying the following conditional expressions, $v_d>60.0$, $\Delta\theta_{g,F}>0.003$, where, $v_d$ is an Abbe's number of at least one positive lens in the first lens group, and $\Delta\theta_{g,F}$ is abnormal dispersion of the positive lens, the abnormal dispersion $\Delta\theta_{g,F}$ is a diffraction from a standard line of glass types which is a straight standard line connecting a glass type K7 and a glass type F2 in a graph having an Abbe's number on a horizontal axis and a partial dispersion ratio $\theta_{g,F}=(n_g-n_F)/(n_F-n_C)$ on a vertical axis, and ng, $n_F$, $n_C$ are refractive indexes relative to a g line, an F line, and a C line, respectively.

Preferably, the aspherical surface is provided in the positive lens of the first lens group, and the positive lens provided with the aspherical surface does not satisfy the above-described conditional expressions.

Preferably, a focal length of the positive lens of the first lens group satisfying the conditional expressions set forth in claim 1, $f_{ap}$, and a focal length of an entire system at the wide-angle end, $f_W$, satisfies the following conditional expression, $7.0<f_{ap}/f_W<17.0$.

Preferably, the negative lens of the first lens group is a negative meniscus lens having a convex face to the object, each of the two positive lenses of the first lens group includes a face having a large curvature to the object, the negative lens is arranged in a position close to the object compared to positions of the two positive lenses, and the aspherical surface is disposed in one of the two positive lenses, which is close to the image.

Preferably, an aperture stop is disposed between the second lens group and the third lens group, and the aperture stop moves independently of the adjacent lens groups.

Preferably, an aperture stop is disposed between the second lens group and the third lens group, the second lens group includes at least one aspherical surface, and the third lens group includes at least one aspherical surface.

Preferably, a distance from the aspherical surface of the first lens group to the aspherical surface of the second lens group at the wide-angle end, $L_{a1-a2}W$, a distance from the aspherical surface of the first lens group to the aperture stop at the wide-angle end, $L_{a1-s}W$, a distance from the aspherical surface of the first lens group to the aspherical surface of the second lens group at the telephoto end, $L_{a1-a2}T$, and a distance from the aspherical surface of the first lens group to the aperture stop at the telephoto end, $L_{a1-s}T$, satisfy the following conditional expressions, $0.40<L_{a1-a2}W/L_{a1-s}W<0.70$, $0.80<L_{a1-a2}T/L_{a1-s}T<1.00$, and where one lens group includes a plurality of aspherical surfaces, a value of the aspherical surface closest to the aperture stop is used.

Preferably, a distance from the aperture stop to the aspherical surface of the third lens group at the wide-angle end, $L_{a-a3}W$, and a distance from the aperture stop to the aspherical surface of the third lens group at the telephoto end, $L_{s-a3}T$, satisfied the following conditional expressions, $0.10<L_{a-a3}W/L_{a1-s}W<0.40$, $0.00<L_{s-a3}T/L_{a1-s}T<0.20$, where one lens group includes a plurality of aspherical surfaces, a value of the aspherical surface closest to the aperture stop is used.

Preferably, the third lens group includes two positive lenses and one negative lens.

Preferably, the negative lens of the third lens group includes a strong concave face to the image, and is arranged in a position close to the image compared to positions of the two positive lenses, and a curvature radius of the face closest to the image in the third lens group, $f_{3R}$ and a focal length of an entire system at the wide-angle end, $f_W$ satisfy the following conditional expression, $0.70<|r_{3R}/f_W|<1.30$.

A second aspect of the present invention relates to a camera including the zoom lens according to the first aspect of the present invention as a photographing optical system.

A third aspect of the present invention relates to a personal digital assistant device including the zoom lens according to the first aspect of the present invention as a photographing optical system of a camera functioning section.

BRIEF DESCRIPTION OF THE DRAWINGS

The accompanying drawings are included to provide further understanding of the invention, and are incorporated in and constitute a part of this specification. The drawings illustrate embodiments of the invention and, together with the specification, serve to explain the principle of the invention.

FIG. 16 is a view illustrating aberration curves in an intermediate focal length of the zoom lens according to the fourth embodiment of the present invention.

FIGS. 21A-21C are views each illustrating an external appearance of a digital camera describing one embodiment of a camera (portable digital assistant) according to the present invention, wherein FIG. 21A is a perspective view of a front side in a collapsed state, FIG. 21B is a perspective view describing a part of the front side when using (when a lens is extended out), and FIG. 21C is a perspective view of a back face.

DETAILED DESCRIPTION OF THE PREFERRED EMBODIMENTS

Figure 1:
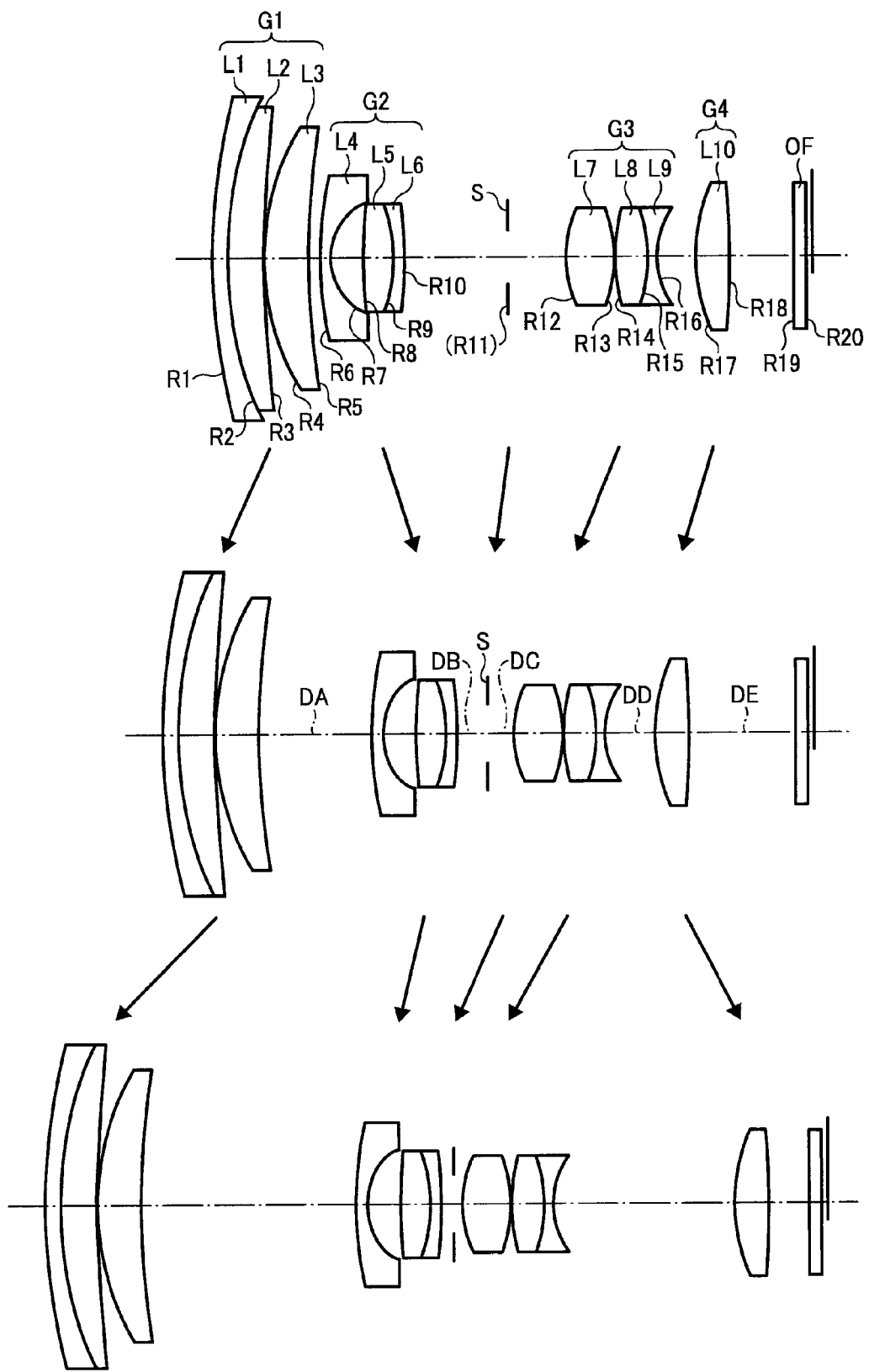
FIG. 1 is a sectional view illustrating a structure of a zoom lens according to a first embodiment of the present invention.

Hereinafter, a zoom lens, a camera and a portable digital assistant device using the zoom lens as a photographing optical system will be described according to embodiments of the present invention with reference to the drawings.

As illustrated in FIGS. 1-4, a zoom lens described in each of the embodiments 1-4 of the present invention includes, in order from an object side to an image side, a first lens group G1 having positive refractive power, a second lens group G2 having negative refractive power, a third lens group G3 having positive refractive power, and a fourth lens group G4 having positive refractive power.

In such a zoom lens, when varying a magnification (varying a field angle) from a wide-angle end to a telephoto end, the first lens group G1 and the third lens group G3 move to be located on the object side at the telephoto end rather than at the wide-angle end, such that the distance between the first lens group G1 and the second lens group G2 increases, the distance between the second lens group G2 and the third lens group G3 decreases, and the distance between the third lens group G3 and the fourth lens group G4 increases.

The zoom lens illustrated in each of FIGS. 1-4 includes a first lens L1, a second lens L2, a third lens L3, a fourth lens L4, a fifth lens L5, a sixth lens L6, a seventh lens L7, an eighth lens L8, a ninth lens L9, a tenth lens L10, an aperture stop S, and an optical filter OF.

In this case, the first to third lenses L1-L3 constitute the first lens group G1, the fourth to sixth lenses L4-L6 constitute the second lens group G2, the seventh to ninth lenses L7-L9 constitute the third lens group G3, and the tenth lens L10 constitutes the fourth lens group G4. Each of the lens groups is supported by a supporting frame, which is common to each of the lens groups. Each of the groups moves together in the zooming. In FIGS. 1-4, reference numbers R1-R20 denote face numbers of optical faces, respectively.

An aperture stop S is disposed between the second lens group G2 and the third lens group G3, and the position of the aperture stop S varies upon zooming.

The zoom lens having the above structure has the following features.

In the zoom lens having the four lens groups of positive, negative, positive and positive, the second lens group G2 generally functions as a so-called variator which shears a main variable magnification function.

However, in the present invention, since the third lens group G3 shares a variable magnification function, so as to reduce the shearing of the second lens group G2, a degree of freedom of aberration correction, which becomes difficult along a wide-angle and a high variable magnification, is ensured. In addition, when varying a magnification from the wide-angle end to the telephoto end, by significantly moving the first lens group G1 to the object side, the height of a ray passing through the first lens group G1 at the wide-angle end is reduced, so that the increase in the size of the first lens group G1 associated with a wide-angle can be controlled, and also a distance DA between the first lens group G1 and the second lens group G2 can be increased, so that a long focus can be achieved.

When varying a magnification from the wide-angle end to the telephoto end, the distance DA between the first lens group G1 and the second lens group G2 increases, a distance DB+DC between the second lens group G2 and the third lens group G3 decreases, so that the magnification (absolute value) of the second lens group G2 and the magnification (absolute value) of the third lens group G3 increase, and the second lens group G2 and the third lens group G3 share the variable magnification function.

In the zoom lens according to one embodiment of the present invention, the first lens group G1 includes one negative lens L1 and two positive lenses L2, L3, an aspherical surface is disposed in the first lens group G1, and the following conditional expressions (1) (2) are satisfied.

$$v_d > 60.0 \quad (1)$$

$$\Delta\theta_{g,F} > 0.003 \quad (2)$$

Where $v_d$ is an Abbe's number of at least one positive lens in the first lens group G1 and $\Delta\theta_{g,F}$ is abnormal dispersion of the positive lens.

In this case, the abnormal dispersion, $\Delta\theta_{g,F}$ is a deviation from a standard line of glass types, which is a straight line connecting the glass type K7 (OHARA INC NSL7) and the glass type F2 (OHARA INC PBM2) in a graph illustrating an Abbe's number $v_d$ on the horizontal axis and a partial dispersion ratio $\theta_{g,F} = (n_g - n_F)/(n_F - n_C)$ on the vertical axis. In this case, $n_g$, $n_F$, $n_C$ are refractive indexes relative to a g line, an F line and a C line, respectively.

If a magnification is increased, especially, if a focal length at the telephoto end is increased, it becomes difficult to correct a secondary spectrum of axial chromatic aberrations on the telephoto side. If the focal length of the wide-angle end is decreased, i.e., a field angle is widened, it becomes difficult to correct a secondary spectrum of magnification chromatic aberrations on the wide-angle side. In the present invention, these aberrations are corrected by using a so-called anomalous dispersion glass (glass having large abnormal dispersion). The present invention includes the following features.

In general, in order to reduce the secondary spectrum of the axial chromatic aberrations, it is effective to use the anomalous dispersion glass for a lens group having a high axial beam height. The first lens group G1 has the highest axial beam height. For this reason, by using a low dispersive anomalous dispersion glass for the positive lens of the first lens group G1, the secondary spectrum of the axial chromatic aberrations can be effectively reduced. However, since the low anomalous dispersion glass generally has a low refractive index, the correction ability of the monochromatic aberrations is decreased. For this reason, when reducing the monochromatic aberrations and the chromatic aberrations with a good balance while constituting the first lens group G1 with a small number of lenses, it is not always effective to use the anomalous dispersion glass.

Accordingly, in the embodiment of the present invention, at least one aspherical surface is disposed in the first lens group G1, so as to ensure a degree of freedom relative to the correction of the monochromatic aberrations. This aspherical surface is effective for correcting distortion and astigmatism at the wide-angle end and also for correcting spherical aberrations and coma aberrations at the telephoto-end, and can sufficiently recover the decrease in the correction performance of the monochromatic aberrations associated with the use of the spherical low dispersion glass having a low refractive index. In addition, since the first lens group G1 moves when varying a magnification, the condition of a ray passing through the aspherical surface can be controlled by this movement. Thus, the effect by the aspherical surface relatively increases, compared to the case when the first lens group G1 is fixed.

The movement of the first lens group G1 when varying a magnification is effective for the degree of freedom of correction of the chromatic aberrations caused by the use of the special low dispersion glass, and also is effective for reducing the secondary spectrum of not only the axial chromatic aberrations but also the magnification chromatic aberrations.

As described above, according to the embodiment of the present invention, the secondary spectrum of the chromatic aberrations can be reduced and the monochromatic aberrations can be sufficiently corrected with the first lens group G1 having the three lenses. Therefore, for example, a further downsized zoom lens can be achieved by the increased degree of freedom. In this case, if $\nu_d$ is 60 or less, the chromatic aberrations are not sufficiently corrected, and if $\Delta\theta_{g,F}$ is 0.003 or less, the secondary spectrum of the chromatic aberrations is not sufficiently corrected.

In the zoom lens according to the embodiment of the present invention, it is preferable for the aspherical surface of the first lens group G1 to be disposed in the positive lens. It is desirable for the positive lens provided with the aspherical surface not to satisfy the above-described conditional expressions (1), (2).

The negative lens of the first lens group G1 is a glass type having a high reflective index and high dispersion for correcting the chromatic aberrations. However, it is difficult to process the aspherical lens using the glass type having a high refractive index and high dispersion. When using a glass mold type which molds a glass by softening at a high temperature, a glass type having a high refractive index and high dispersion, which is suitable for the glass mold type, is limited. In addition, when a hybrid type which forms an aspherical surface layer on a plane of a spherical grinded lens by an ultraviolet hardening type resin is used, a low ultraviolet passing rate, which is a feature of a glass type having a high refractive index and high dispersion, becomes a problem.

On the other hand, the positive lens of the first lens group G1 does not have high dispersion as the negative lens. Therefore, it is relatively easy for the positive lens in the first lens group G1 to be an aspherical surface lens. It is also easy to select a glass type suitable for a glass mold, and when a hybrid type is used, the ultraviolet passing rate is not a major problem. However, the composition of the anomalous dispersion glass, which satisfies the above-described conditional expressions (1), (2), is not suitable for the glass mold. In addition, such an anomalous dispersion glass is soft and is easily scratched, so it also is not suitable for the hybrid type which requires aftertreatments.

In the zoom lens according to the embodiment of the present invention, it is preferable for the positive lens made of the anomalous dispersion glass of the first lens group G1 to have refractive power which satisfies the following conditional expression (3).

$$7.0 < f_{ap}/f_W < 17.0 \qquad (3)$$

Where, $f_{ap}$ is a focal length of the positive lens in the first lens group G1 which satisfies the above-described conditional expressions (1), (2), and $f_W$ is a focal length of an entire system at the wide-angle end.

If $f_{ap}/f_W$ is 17.0 or more, the refractive power of the lens using the anomalous dispersion glass can not effectively reduce the secondary spectrum. Therefore, the chromatic aberrations may not be effectively corrected. On the other hand, if $f_{ap}/f_W$ is 7.0 or less, it becomes difficult to balance the correction of the chromatic aberrations and the correction of the monochromatic aberrations such as spherical aberrations at the telephoto end.

It is preferable for the first lens group G1 to include, in order from the object side, the negative meniscus lens L1 having a convex face on the object side, the positive lens L2 having a large curvature face on the object side, and the positive lens L3 having a large curvature face on the object side, and to have the aspherical surface disposed in the positive lens L3 closest to the image side.

As for the structure of the first lens group G1 of the positive advanced zoom lens including a wide-angle area, the above-described structure of the negative, positive, positive from the object side is excellent in the aberration correction ability. In addition, as for the aspherical surface, since a smaller diameter is easier to make, it is ideal to dispose the anomalous dispersion glass lens on the object side and to dispose the aspherical lens on the image side in the two positive lenses. The first lens group G1 is an important lens group for obtaining a basic real image, and can sufficiently correct the aberrations by using the above-described structure.

In the zoom lens according to the embodiment of the present invention, the aperture stop S can be disposed between the second lens group G2 and the third lens group G3, and the aperture stop S can be moved independently of the adjacent lens groups (G2, G3). By this structure, the most appropriate ray path can be selected at any position in the large variable magnification area of 6.5 times or more. Accordingly, the degree of freedom for correcting the coma aberrations, field curvature and the like is improved; thus, the off-axis performance can be improved.

It is preferable for the distance DC between the aperture stop S and the third lens group G3 at the wide-angle end to be longer than that at the telephoto end. Therefore, the aperture stop S comes closer to the first lens group G1, so as to lower the height of the ray passing through the first lens group G1. Accordingly, the first lens group G1 can be further effectively downsized.

For the reason described above, when increasing the distance between the aperture stop S and the third lens group G3 at the wide-angle end relative to that at the telephoto end, it is preferable for the distance to satisfy the following conditional expression (4).

$$0.05 < d_{SW}/f_T < 0.20 \quad (4)$$

Where, $d_{SW}$ is an axial distance between the aperture stop S and the face closest to the object side in the third lens group G3 at the wide-angle end, and $f_T$ is a focal distance of the entire system at the wide-angle end.

If $d_{SW}/f_T$ is 0.05 or less, the height of a ray passing through the first lens group G1 at the wide-angle end increases. For this reason, the size of the first lens group G1 is increased, and also the contribution of the third lens group G3 relative to the off-axis aberrations is reduced. On the other hand, if $d_{SW}/f_T$ is 0.20 or more, the height of a ray passing through the third lens group G3 at the wide-angle end becomes too big. Therefore, it becomes difficult to ensure the performance in the wide-angle range, for example, the image face unduly inclines and the barrel distortion easily increases.

In the zoom lens according to the embodiment of the present invention, it is preferable to dispose the aperture stop S between the second lens group G2 and the third lens group G3, and for each of the second lens group G2 and the third lens group G3 to have at least one aspherical surface. By providing the aspherical surface on each of the first lens group G1, the second lens group G2 and the third lens group G3 which are important for focusing and varying a magnification, the degree of freedom for correcting the monochromatic aberrations is significantly improved.

It is also preferable to dispose the aspherical surface in the first lens group G1 and the second lens group G2, so as to satisfy the following conditional expressions (5), (6).

$$0.40 < L_{a1-a2}W/L_{a1-s}W < 0.70 \quad (5)$$

$$0.80 < L_{a1-a2}T/L_{a1-s}T < 1.00 \quad (6)$$

Where, $L_{a1-a2}W$ is a distance from the aspherical surface of the first lens group G1 to the aspherical surface of the second lens group G2 at the wide-angle end, $L_{a1-s}W$ is a distance from the aspherical surface of the first lens group G1 to the aperture stop S at the wide-angle end, $L_{a1-a2}T$ is a distance from the aspherical surface of the first lens group G1 to the aspherical surface of the second lens group G2 at the telephoto end, and $L_{a1-s}T$ is a distance from the aspherical surface of the first lens group G1 to the aperture stop S at the telephoto end. When one lens group includes a plurality of aspherical surfaces, a value of the aspherical surface closest to the aperture stop S is used.

Each distance between the aspherical surfaces disposed in the lens groups, respectively, changes by the movement for varying a magnification. On the other hand, the distance between each aspherical surface and the aperture stop S changes by the movement for varying a magnification. The distance between each aspherical surface and the aperture stop S is closely linked to the height of an off-axis main ray, and the height of an axial marginal ray. The effect of the aberration correction of the aspherical surface disposed in each lens group changes according to the distance between the aspherical surfaces and the distance from the aperture stop S. The aspherical surfaces disposed in the first lens group G1 and the second lens group G2, respectively, can effectively contribute to the correction of the distortion and astigmatism at the wide-angle end and the spherical aberrations and the coma aberrations at the telephoto end by satisfying the above-described conditional expressions.

It is preferable for the aspherical surfaces of the first lens group G1 and the third lens group G2 to satisfy the following conditional expressions (7), (8).

$$0.10 < L_{s-a3}W/L_{a1-s}W < 0.40 \quad (7)$$

$$0.00 < L_{s-a3}T/L_{a1-s}T < 0.20 \quad (8)$$

Where, $L_{a-a3}W$ is a distance from the aperture stop S to the aspherical surface of the third lens group G3 at the wide-angle end, $L_{s-a3}T$ is a distance from the aperture stop S to the aspherical surface of the third lens group G3 at the telephoto end, and when one lens group includes a plurality of aspherical surfaces, the value of the aspherical surface closest to the aperture stop S is used.

The aspherical surfaces disposed in the first lens group G1 and the third lens group G3 can effectively contribute to the correction of the distortion and the astigmatism at the wide-angle end and the spherical aberrations and the coma aberrations at the telephoto end by satisfying the above-described conditional expressions.

It is most preferable for the aspherical surface disposed in each of the first lens group G1, the second lens group G2, and the third lens group G3 to satisfy the above-described four conditional expressions. Therefore, the effect of the aspherical surface can be maximized, and the preferable focusing performance can be ensured even if the zoom lens is further downsized.

In the zoom lens according to one embodiment of the present invention, it is preferable for the third lens group G3 to include two positive lenses L7, L8, and one negative lens L9. The third lens group G3 is an important lens group having a variable magnification function and a focusing function. If the third lens group G3 has a one lens structure or a two-lens structure, it becomes difficult to preferably correct the monochromatic aberrations and the chromatic aberrations. On the other hand, if the third lens group G3 has four lenses or more, it is disadvantageous for downsizing the zoom lens.

In order to further preferably correct the aberrations, it is desirable to dispose a negative lens L10, which has a strong concave face to the image side, in the third lens group G3 closest to the image side, and also the following conditional expression (9) is satisfied.

$$0.70 < |R_{3R}|/f_W < 1.30 \quad (9)$$

Where, $R_{3R}$ is a curvature radius of the face closest to the image side in the third lens group G3.

If $|R_{3R}|/f_W$ is 0.70 or less, the spherical aberrations are overcorrected. On the other hand, if $|R_{3R}|/f_W$ is 1.30 or more, the spherical aberrations are not significantly corrected. Similar to the spherical aberrations, it is difficult to balance the coma aberrations outside the range of the conditional formulas, so that extrovert or introvert coma aberrations are easily caused.

The aberrations can be significantly corrected by satisfying the following conditional expression in connection with the movement of the first lens group G1 important for a wide-angle and a long focal point.

$$0.20 < X_1/f_T < 0.50 \quad (10)$$

Where, $X_1$ is the total movement of the first lens group G1 when varying a magnification from the wide-angle end to the telephoto end, and $f_T$ is a focal length of the entire system at the telephoto end.

If $X_1/f_T$ is 0.20 or less, the contribution of the second lens group G2 to the variable magnification is reduced. For this reason, the load of the third lens group G3 is increased, or the refractive power of the first lens group G1 and the second lens group G2 has to be increased. In either case, various aberrations are deteriorated. Moreover, the total length of the lenses at the wide-angle end is increased, and the height of a ray passing through the first lens group G1 is increased, resulting in the growing in size of the first lens group G1. On the other hand, if $X_1/f_T$ is 0.50 or more, the total length at the wide-angle end becomes too short or the total length at the telephoto end becomes too long. If the total length at the wide-angle end becomes too short, the movement space of the third lens group G3 is limited. Thereby, the contribution of the third lens group G3 to the variable magnification is reduced. Therefore, it becomes difficult to correct the entire aberrations. If the total length at the telephoto end becomes too long, the downsizing of the camera is disturbed, and also the diameter of the lens is increased for ensuring the light quantity around the telephoto end, and the image performance is easily deteriorated by the manufacturing errors such as lens barrel tilt.

It is more preferable to satisfy the following conditional expression (11).

$$0.25 < X_1/f_T < 0.45 \tag{11}$$

It is preferable for the movement of the third lens group G3 to satisfy the following conditional expression (12).

$$0.10 < X_3/f_T < 0.35 \tag{12}$$

Where, X3 is the total movement of the third lens group G3 when varying a magnification from the wide-angle end to the telephoto end.

If $X_3/f_T$ is 0.10 or less, the contribution of the third lens group G3 to the variable magnification is reduced. For this reason, the load of the second lens group G2 has to be increased or the refractive power of the third lens group G3 has to be increased. In either case, various aberrations are deteriorated. On the other hand, if $X_3/f_T$ is 0.35 or more, the total length of the lenses at the wide-angle end is increased, and the height of a ray passing through the first lens group G1 is increased, resulting in the growing in size of the first lens group G1.

It is further preferable to satisfy the following conditional expression (13).

$$0.15 < X_3/f_T < 0.30 \tag{13}$$

In addition, for correcting the aberrations, it is preferable to satisfy the following conditional expressions (14), (15) regarding the refractive power of each group.

$$0.50 < |f_2|/f_3 < 0.85 \tag{14}$$

$$4.5 \le f_1/f_W < 7.5 \tag{15}$$

Where, $f_1$ is a focal length of the first lens group G1, $f_2$ is a focal length of the second lens group G2, $f_3$ is a focal length of the third lens group G3, and $f_W$ is a focal length of the entire system at the wide-angle end.

If $|f_2|/f_3$ is 0.50 or less, the refractive power of the second lens group G2 becomes too strong, and if $|f_2|/f_3$ is 0.85 or more, the refractive power of the third lens group G3 becomes too strong. In either case, the aberration deflection when varying a magnification is increased.

If $f_1/f_W$ is 4.5 or less, the focusing magnification of the second lens group G2 comes close to the same magnification, and the variable magnification efficiency is increased. This is effective for increasing a variable magnification, but each of the lenses in the first lens group G1 requires large refractive power. Therefore, the chromatic aberrations at the telephoto end are deteriorated, and the thickness and the diameter in the first lens group G1 are increased; thus, it is disadvantageous for downsizing the zoom lens especially in the collapsed state.

On the other hand, if $f_1/f_W$ is 7.5 or more, the contribution of the second lens group G2 to the variable magnification becomes too small. Accordingly, it becomes difficult to increase a variable magnification.

It is preferable for the second lens group G2 to include, in order from the object side, three lenses of the negative lens L4 having a large curvature face to the image side, the positive lens L5 having a large curvature face to the image side, and the negative lens L6 having a large curvature face to the object side.

When the second lens group G2 has three lenses, the arrangement of a negative lens, a negative lens and a positive lens in order from the object side is well known as the variable mortification group having negative refractive power. However, compared to this structure, the above-described structure is superior to the correction performance of the chromatic aberrations of magnification associated with the wide-angle. In this case the second lens and the third lens from the object side may be appropriately cemented.

In this case, it is preferable for each lens of the second lens group G2 to satisfy the following conditional expressions (16), (17), (18).

$$1.80 < N21 < 2.15, \ 25 < \nu 21 < 50 \tag{16}$$

$$1.80 < N22 < 2.15, \ 15 < \nu 22 < 30 \tag{17}$$

$$1.80 < N23 < 2.15, \ 25 < \nu 23 < 50 \tag{18}$$

Where, N2i is a refractive index of ith lens of the second lens group G2 from the object side, and ν2i is an Abbe's number of ith lens of the second lens group G2 from the object side.

By selecting the glass type having the above refractive index and the Abbe's number, the monochromatic aberrations and the chromatic aberrations can be preferably corrected, and the thickness of the second lens group G2 is further reduced.

It is preferable for the third lens group G3 to include, in order from the object side, three lenses of the positive lens L7, the positive lens L8, and the negative lens L9. In this case, the second lens L8 and the third lens L9 from the object side may be appropriately cemented.

The aspherical surface is necessary for further downsizing the zoom lens while maintaining preferable aberration correction. It is preferable for at least the second lens group G2 and the third lens group G3 to have one or more apsherical surfaces. Especially in the second lens group G2, if the aspherical surface is adopted for both of the surface closest to the object side and the surface closest to the image side, it is effective for correcting the distortion, the astigmatism and the like which increase associated with a wide-angle.

In addition, the molded optical glass and the molded optical plastic (glass mold aspherical surface, plastic mold aspherical surface and the like), the molded resin layer on the glass lens surface (hybrid aspherical surface, replica aspherical surface and the like), and the like can be used as the aspherical surface lens.

It is simple to maintain an opening diameter of the aperture stop regardless of a variable magnification. However, by increasing the opening diameter at the long focus end compared to the owning diameter at the short focus end, the change in the F-number associated with a variable magnification can be reduced. When it is necessary to reduce the light volume reaching the image face, the diameter in the aperture stop may be reduced. However, it is preferable to reduce the light volume by inserting an ND filter or the like without significantly changing the diameter in the aperture stop because the decrease in the resolution by the diffractive phenomenon can be prevented.

The above-described first to fourth embodiments of the present invention include the four group structure of positive, negative, positive and positive. More particularly, the four group structure includes, in order from the object side to the image side, the first lens group having positive refractive power, the second lens group having negative refractive power, the third lens group having positive refractive power and the fourth lens group having positive refractive power. Hereinafter, a five group structure of positive, negative, positive, positive and negative will be described as a fifth embodiment More particularly, the five group structure includes, in order from the object side to the image side, a first lens group having positive refractive power, a second lens group having negative refractive power, a third lens group having positive refractive power, a fourth lens group having positive refractive power and a fifth lens group having negative refractive power.

Figure 5:
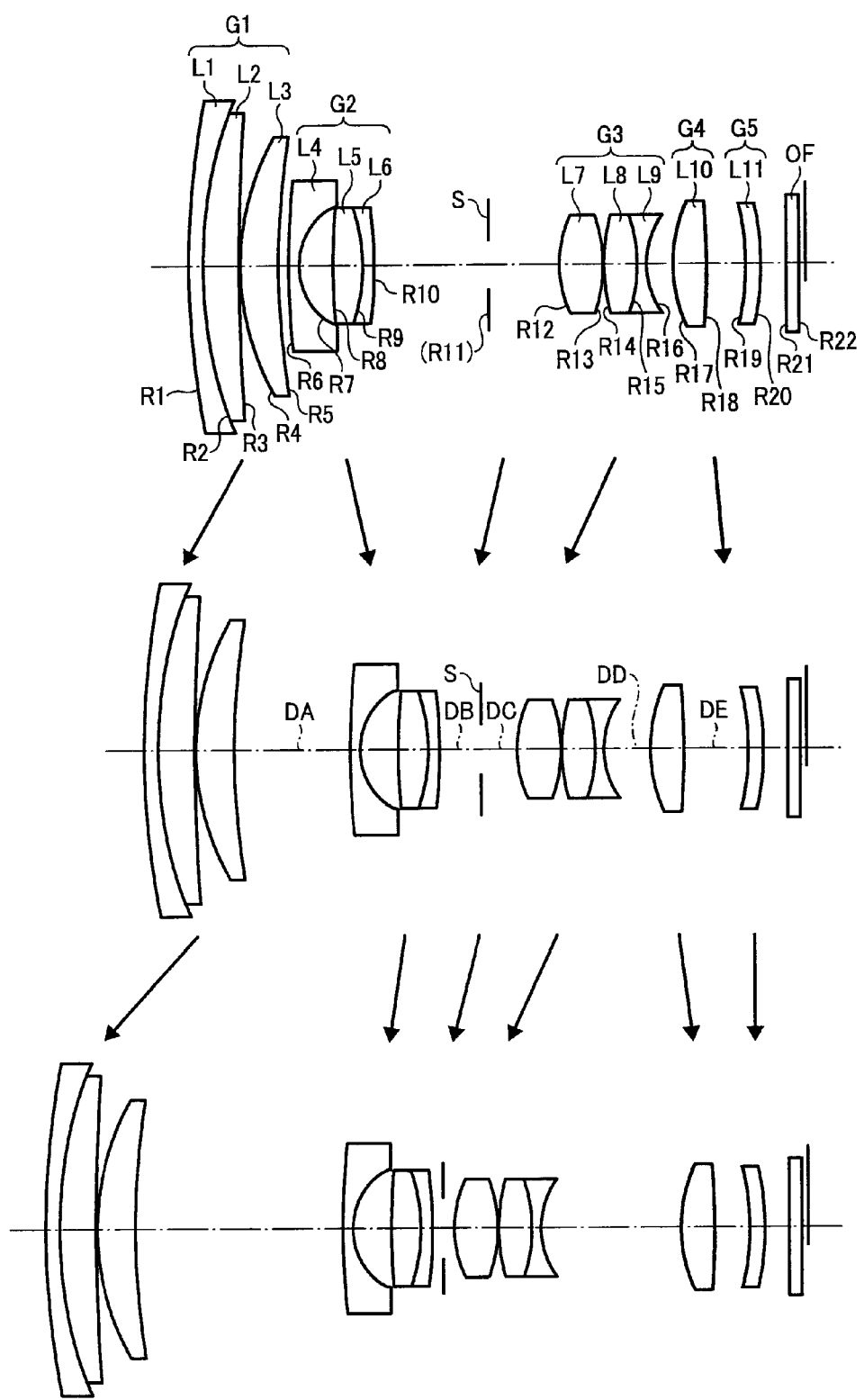
FIG. 5 is a sectional view illustrating a structure of a zoom lens according to a fifth embodiment of the present invention.

As illustrated in FIG. 5, according to the fifth embodiment of the present invention, the first lens group G1 having positive refractive power, the second lens group G2 having negative refractive power, the third lens group G3 having positive refractive power, the fourth lens group G4 having positive refractive power and the fifth lens group G5 having negative refractive power are disposed in order from the object side to the image side.

In the zoom lens according to this embodiment of the present invention, when varying a magnification (varying a field angle) from the wide-angle end to the telephoto end, the first lens group G1 and the third lens group G3 move to be located on the object side at the telephoto end rather than at the wide-angle end, and the fifth lens group G5 is fixed, such that the distance between the first lens group G1 and the second lens group G2 increases, the distance between the second lens group G2 and the third lens group G3 decreases, and the distance between the third lens group G3 and the fourth lens group G4 increases.

The zoom lens illustrated in FIG. 5 includes a first lens L1, a second lens L2, a third lens L3, a fourth lens L4, a fifth lens L5, a sixth lens L6, a seventh lens L7, an eighth lens L8, a ninth lens L9, a tenth lens L10, an eleventh lens L11, an aperture stop S and an optical filter OF.

In this case, the first to third lenses L1-L3 constitute the first lens group G1, the fourth to sixth lenses L4-L6 constitute the second lens group G2, the seventh to ninth lenses L7-L9 constitute the third lens group G3, the tenth lens L10 constitutes the fourth lens group G4, and the eleventh lens L11 constitutes the fifth lens group G5. Each lens group is appropriately supported by a supporting frame common to each group, and each group moves together when zooming. In addition, FIG. 5 illustrates the surface numbers R1 to R22 of each optical face.

The aperture stop S is disposed between the second lens group G2 and the third lens group G3, and the position of the aperture stop S is varied upon zooming.

The zoom lens having the above-described structure according to the fifth embodiment of the present invention has the following features.

In the zoom lens having the five lens groups of positive, negative, positive, positive, and negative, the second lens group G2 generally is constituted as a so-called variator which shares a main variable magnification function. However, in this embodiment, the third lens group G3 also shares the variable magnification function, so as to reduce the load of the second lens group G2. Therefore, the degree of freedom of the aberration correction, which becomes difficult associated with a wide-angle and high variable magnification, is ensured. In addition, by significantly moving the first lens group G1 to the object side when varying a magnification from the wide-angle end to the telephoto end, the height of a ray passing through the first lens group G1 at the wide-angle end is reduced. Therefore, the growing in the size of the first lens group G1 associated with a wide-angle can be controlled, and the large distance DA between the first lens group G1 and the second lens group G2 at the telephoto end can be ensured, so as to achieve a long focal point.

When varying a magnification from the wide-angle end to the telephoto end, the distance DA between the first lens group G1 and the second lens group G2 increases, the distance DB+DC between the second lens group G2 and the third lens group G3 is reduced, so the magnification (absolute value) of the second lens group G2 and the magnification (absolute value) of the third lens group G3 are increased, so that the second lens group G2 and the third lens group G3 share the variable magnification function with each other.

Moreover, in the zoom lens according to the fifth embodiment of the present invention, the first lens group G1 includes one negative lens L1 and two positive lenses L2, L3, an aspherical surface is disposed in the first lens group G1, and the following conditional expressions (19), (20) are satisfied.

$$v_d > 60.0 \quad (19)$$

$$\Delta\theta_{g,F} > 0.003 \quad (20)$$

Where, $v_d$ is an Abbe's number of at least one positive lens in the first lens group G1, and $\Delta\theta_{g,F}$ is abnormal dispersion of the positive lens.

In this case, the abnormal dispersion $\Delta\theta_{g,F}$ is a deflection from a standard line of glass types, which is a straight line connecting a glass type K7 (NSL 7 OHARA INC) and a glass type F2 (PBM2 OHARA INC) in a graph having an Abbe's number $v_d$ on the horizontal axis and a partial dispersive rate $\theta_{g,F}=(n_g-n_F)/(n_F-n_C)$ on the vertical axis. Moreover, $n_g$, $n_F$, and $n_C$ are refractive indexes relative to a g line, an F line, and a C line, respectively.

If a focal length at the telephoto end is increased, i.e., a high variable magnification, it becomes difficult to correct the secondary spectrum of axial chromatic aberrations on the telephoto side. If a focal length at the wide-angle end is reduced, i.e., a wide-angle, it becomes difficult to correct the secondary spectrum of the chromatic aberrations of magnification on the wide-angle side. According to the present embodiment, the chromatic aberrations are corrected by a so-called anomalous dispersion glass (glass having large abnormal dispersion). The zoom lens according to the present embodiment includes the following features.

In order to reduce the secondary spectrum of the axial chromatic aberrations, it is generally effective to use an anomalous dispersion glass in a lens group having a high axial ray height. The first lens group G1 has the highest axial ray height. By adopting the anomalous dispersion glass having low dispersion to the positive lens of the first lens group G1, the secondary spectrum of the axial chromatic aberrations is significantly reduced. However, the anomalous dispersion glass having low dispersion generally has a low refractive index; thus, the correction ability of the monochromatic aberrations is lowered. For this reason, the use of the anomalous dispersion glass is not always effective for reducing the monochromatic aberrations and the chromatic aberrations with a good balance while constituting the first lens group G1 with a small number of lenses.

In this fifth embodiment of the present invention, similar to the first to fourth embodiments, the aspherical surface is disposed in at least one face in the first lens group G1, so as to ensure the degree of freedom relative to the correction of the monochromatic aberrations. This aspherical surface is effective for correcting the distortion and the astigmatism at the wide-angle end and also the spherical aberrations and the coma aberrations at the telephoto end. Accordingly, the decrease in the correction ability of the monochromatic aberrations caused by the use of the special low dispersion glass having a low refractive index can be significantly recovered. In addition, since the first lens group G1 moves when varying a magnification, the state of the ray passing through the aspherical surface can be controlled by this movement. Consequently, the effect of the aspherical surface is relatively increased, compared to the case in which the first lens group G1 is fixed.

The movement of the first lens group G1 when varying a magnification is effective for the freedom degree of the correction of the chromatic aberrations caused by the use of the special low dispersion glass. It is also effective for reducing not only the axial chromatic aberrations but also the secondary spectrum of the chromatic aberrations of the magnification.

As described above, according to the embodiment of the present invention, although the first lens group G1 includes three lenses, the secondary spectrum of the chromatic aberrations can be reduced and also the monochromatic aberrations can be sufficiently corrected. Accordingly, by using the increased degree of freedom, a further downsized zoom lens can be achieved, for example. In this case, if $v_d$ is 60 or less, the correction of the chromatic aberrations becomes insufficient, and if $\Delta\theta_{g,F}$ is 0.003 or less, the correction of the secondary spectrum of the chromatic aberrations becomes insufficient.

In the zoom lens according to one embodiment of the present invention, it is preferable to dispose the aspherical surface in the positive lens of the first lens group G1. It is also desirable for the positive lens provided with the aspherical surface not to satisfy the conditional expressions (1), (2).

The negative lens of the first lens group G1 includes a glass type having a high refractive index and high dispersion for correcting the chromatic aberrations. However, it is difficult to process the aspherical surface using the glass type having a high refractive index and high dispersion. When using a glass mold type which molds a glass by softening at a high temperature, a glass type having a high refractive index and high dispersion, which is suitable for the glass mold type, is limited. In addition, when a hybrid type which forms an aspherical surface layer on a plane of a spherical ground lens by an ultraviolet hardening type resin is used, a low ultraviolet passing rate, which is a feature of a glass type having a high refractive index and high dispersion, becomes a problem.

On the other hand, the positive lens in the first lens group G1 does not have high dispersion like the negative lens. Therefore, it is relatively easy for the positive lens to be an aspherical surface lens. It is also easy to select a glass type suitable for a glass mold, and when a hybrid type is used, the ultraviolet passing rate is not a major problem. However, the composition of the anomalous dispersion glass, which satisfies the above-described conditional expressions (1), (2), is not suitable for the glass mold. In addition, such an anomalous dispersion glass is soft and is easily scratched, so it also is not suitable for the hybrid type which requires aftertreatments.

In the zoom lens according to the embodiment of the present invention, it is preferable for the positive lens composed of the anomalous dispersion glass of the first lens group G1 to have refractive power which satisfies the following conditional expression (21).

$$7.0 < f_{ap}/f_W < 17.0 \quad (21)$$

Where, $f_{ap}$ is a focal length of the positive lens in the first lens group G1 which satisfies the above-described conditional expressions (1), (2), and $f_W$ is a focal length of the entire system at the wide-angle end.

If $f_{ap}/f_W$ is 17.0 or more, the refractive power of the lens using the anomalous dispersion glass can not sufficiently reduce the secondary spectrum; thus, the chromatic aberrations may not be effectively corrected. On the other hand, if $f_{ap}/f_W$ is 7.0 or less, it becomes difficult to balance the correction of the chromatic aberrations and the correction of the monochromatic aberrations such as the spherical aberrations at the telephoto end.

In the fifth embodiment, the parts of the first to fourth embodiments including the conditional expressions are incorporated, and the duplicated description is omitted.

Hereinafter, the specific embodiments (first to fifth embodiments) of the zoom lens according to the present invention will be described. In addition, in all the embodiments, the maximum image height is 4.05 mm.

The parallel plate OF disposed on the image face side of the fourth lens group G4 in each of the first to fourth embodiments and the parallel plate OF disposed on the image face side of the fifth lens group G5 in the fifth embodiment are various filters such as an optical low-pass filter and an infrared cut filter, or a cover glass (sealing glass) of a light-receiving element such as a CCD sensor.

In all the embodiments, the materials of the lenses are all optical glass in addition to the optical plastic for use in the positive lens L10 provided in the fourth lens group G4, The aberrations in the embodiments are effectively corrected. The zoom lens can correspond to the light-receiving element having 7 to 10 million pixels. By constituting the zoom lens as described above, a preferable image performance can be ensured while downsizing the zoom lens.

The meanings of signs in the embodiments are as follows,
f: focal length of entire system
ω: F-number
m: half field angle
R: radius curvature
D: surface distance
$N_d$: refractive index
$v_d$: Abbe's number
K: conical constant of aspherical surface
$A_4$: fourth-order aspherical coefficient
$A_6$: sixth-order aspherical coefficient
$A_8$: eighth-order aspherical coefficient
$A_{10}$: tenth-order aspherical coefficient
$A_{12}$: twelfth-order aspherical coefficient
$A_{14}$: fourteenth-order aspherical coefficient
$A_{16}$: sixteenth-order aspherical coefficient
$A_{18}$: eighteenth-order aspherical coefficient The aspherical surface is defined by the following expression, where an inverse of paraxial curvature radius (paraxial curvature) is C, and a height from the optical axis is H.

[Expression 1]

$$X = \frac{CH^2}{1 + \sqrt{1-(1+K)C^2H^2}} + A_4 \cdot H^4 + A_6 \cdot H^6 + A_8 \cdot H^8 + A_{10} \cdot H^{10} + A_{12} \cdot H^{12} + A_{14} \cdot H^{14} + A_{16} \cdot H^{16} + A_{18} \cdot H^{18} \quad (1)$$

As for the aberration curves described hereinafter, in the spherical aberrations, the solid line denotes the spherical aberrations and the dotted line denotes the sine condition, in the astigmatism, the solid line denotes the sagittal image face and the dotted line denotes the meridional image face. In addition, one solid line denotes the d line (587.56 nm) and the other solid line denotes the g line (435.83 nm).

First Embodiment

FIG. 1 is a sectional view illustrating the structure of the optical system of the zoom lens according to the first embodiment of the present invention.

In FIG. 1, the upper part illustrates the structure at the wide-angle end, the middle part illustrates the structure at the intermediate focal length, and the lower part illustrates the structure at the telephoto end regarding the optical system of the zoom lens according to the first embodiment of the present invention.

The zoom lens illustrated in FIG. 1 includes, in order from the object side, the first lens L1, the second lens L2, the third lens L3, the fourth lens L4, the fifth lens L5, the sixth lens L6, the aperture stop S, the seventh lens L7, the eighth lens L8, the ninth lens L9, the tenth lens L10 and the optical filter OF. An image is focused on the back of the optical filter OF having various optical filtering functions. In this case, the first to third lenses L1-L3 constitute the first lens group G1, the fourth to six lenses L4-L6 constitute the second lens group G2, the seventh to ninth lenses L7-L9 constitute the third lens group G3, and the tenth lens L10 constitutes the fourth lens group G4. Each of the groups is supported by a supporting frame, and each of the lens groups moves together in zooming.

The first lens L1 is the negative meniscus lens having a convex face on the object side, the second lens L2 is the positive lens having a large curvature face on the object side, and the third lens group L3 is the positive lens having a large curvature face on the object side. In this case, the first lens L1 and the second lens L2 are integrally cemented as a cemented lens. The first lens group G1 having the first to third lenses L1-L3 includes as a whole a positive focal length, i.e., positive refractive power. The fourth lens L4 is the negative meniscus lens having a convex face on the object side, the fifth lens L5 is a biconvex lens having a large curvature face on the image side, and the sixth lens L6 is the negative meniscus lens having a convex face on the image side. In this case, the fifth lens L5 and the sixth lens L6 are integrally cemented as a cemented lens. The second lens group G2 having the fourth to sixth lenses L4-L6 includes as a whole a negative focal length, i.e., negative refractive power. Reference number S denotes the aperture stop which moves in zooming.

The seventh lens L7 is a biconvex lens having a large curvature face on the object side, the eighth lens L8 is a biconvex lens having a large curvature face on the image side, and the ninth lens L9 is a biconcave lens having a large curvature face on the image side. The eighth and ninth lenses L8, L9 are integrally cemented. The third lens group G3 having the seventh to ninth lenses L7-L9 includes as a whole a positive focal length, i.e., positive refractive power.

The tenth lens L10 is a biconvex lens having a large curvature face on the object side. The fourth lens group G4 consists of the tenth lens L10, and includes a positive focal length, i.e., positive refractive power.

When varying a magnification of a focal length from the wide-angle end (short focal end) to the telephoto end (long focal end), the first lens group G1 and the third lens group G3 move to be located on the object side at the telephoto end rather than at the wide-angle end, such that the distance between the first lens group G1 and the second lens group G2 increases, the distance between the second lens group G2 and the third lens group G3 decreases, and the distance between the third lens group G3 and the fourth lens group G4 increases.

The focusing can be conducted by the movement of the second lens group G2 or the fourth lens group G4, or the movement of the light-receiving element.

The optical filter OF having the parallel plate disposed closest to the image side is a filter such as a crystal low pass filter or an infrared cut filter.

By the movement of each lens group G1 to G4 associated with the change in the focal length, a variable distance between each of the lens groups, more particularly, the distance DA between the face closest to the image side in the first lens group G1, i.e., the image side face (face number R5) in the third lens L3 and the face (face number R6) closest to the object side in the second lens group, the distance DB between the face closest to the image side in the second lens group G2, i.e., the image side face (face number R10) of the sixth lens L6 and the aperture stop S, the distance DC between the aperture stop S and the face closest to the object side (face number R12) in the third lens group G3, the distance DD between the face closest to the image side in the third lens group G3, i.e., the image side face (face number R16) of the ninth lens L9 and the face closest to the object side in the fourth lens group G4, i.e., the image side face (face number R17) of the tenth lens L10, and the distance DE between the face closest to the image side in the fourth lens group G4, i.e., the image side face (face number R18) of the tenth lens L10 and the object side face (face number R19) of the optical filter OF are changed.

In the first embodiment, associated with the change in a focal distance from the wide-angle end to the telephoto end, the focal length of the entire system f, the F-number (F-value), and the half field angle change as follows.

f: 5.16-35.09

F-number (F-value): 3.49-5.49 half field angle: 39.34-6.50

The characteristics of each optical face are as shown in the next table (Table 1).

TABLE 1

NUMERICAL EMBODIMENT 1
f = 5.16~35.09, F = 3.49~5.49, ω = 39.34~6.50

| FACE NUMBER | R | D | $N_d$ | $v_d$ | $\Delta\theta_{g,F}$ | GLASS NAME |
|---|---|---|---|---|---|---|
| 01 | 37.931 | 1.00 | 1.92286 | 18.90 | 0.0386 | OHARA S-NPH2 |
| 02 | 23.364 | 2.44 | 1.60300 | 65.44 | 0.0045 | OHARA S-PHM53 |
| 03 | 69.500 | 0.10 | | | | |
| 04* | 16.909 | 2.88 | 1.77250 | 49.60 | −0.0092 | OHARA S-LAH66 |

TABLE 1-continued

NUMERICAL EMBODIMENT 1
f = 5.16~35.09, F = 3.49~5.49, ω = 39.34~6.50

| FACE NUMBER | R | D | $N_d$ | $v_d$ | $\Delta\theta_{g,F}$ | GLASS NAME |
|---|---|---|---|---|---|---|
| 05 | 51.728 | VARIABLE (DA) | | | | |
| 06* | 26.690 | 0.74 | 1.88300 | 40.76 | −0.0088 | OHARA S-LAH58 |
| 07 | 3.993 | 2.26 | | | | |
| 08 | 32.718 | 2.00 | 1.92286 | 18.90 | 0.0386 | OHARA S-NPH2 |
| 09 | −9.991 | 0.64 | 2.00330 | 28.27 | 0.0023 | OHARA S-LAH79 |
| 10* | 277.401 | VARIABLE (DB) | | | | |
| 11 | APERTURE STOP | VARIABLE (DC) | | | | |
| 12* | 6.697 | 3.08 | 1.58913 | 61.15 | −0.0043 | OHARA L-BAL35 |
| 13* | −9.190 | 0.10 | | | | |
| 14 | 10.603 | 2.13 | 1.60300 | 65.44 | 0.0045 | OHARA S-PHM53 |
| 15 | −8.995 | 0.60 | 1.69895 | 30.13 | 0.0103 | OHARA S-TIM35 |
| 16 | 4.836 | VARIABLE (DD) | | | | |
| 17* | 11.374 | 2.17 | 1.52470 | 56.20 | | OPTICAL PLASTIC |
| 18 | −61.183 | VARIABLE (DE) | | | | |
| 19 | ∞ | 0.80 | 1.51680 | 64.20 | | VARIOUS FILTERS |
| 20 | ∞ | | | | | |

In Table 1, each optical face of the fourth face, the sixth face, the tenth face, the twelfth face, the thirteenth face, and the seventeenth face marked with the asterisk "*" is the aspherical surface, and the parameters in the aspherical surface expression of each aspherical surface arc as follows.

Aspherical Surface: Fourth Face

K=0.0, $A_4$=−2.99145×10$^{-6}$, $A_6$=−2.31719×10$^{-8}$, $A_8$=1.30994×10$^{-10}$, $A_{10}$=−1.04295×10$^{-12}$,

Aspherical Surface: Sixth Face

K=0.0, $A_4$=5.30475×10$^{-5}$, $A_6$=−3.02550×10$^{-6}$, $A_8$=1.75806×10$^{-7}$, $A_{10}$=−4.41619×10$^{-9}$ $A_{12}$=−5.03303×10$^{-11}$ $A_{14}$=2.21259×10$^{-12}$

Aspherical Surface: Tenth Face

K=0.0

$A_4$=−5.72615×10$^{-4}$ $A_6$=2.64313×10$^{-7}$ $A_8$=−1.43524×10$^{-6}$ $A_{10}$=−4.40696×10$^{-8}$

Aspherical Surface: Twelfth Face

K=0.0

$A_4$=−7.86511×10$^{-4}$ $A_6$=2.14725×10$^{-5}$ $A_8$=−1.35163×10$^{-6}$ $A_{10}$=4.22984×10$^{-8}$

Aspherical Surface: Thirteenth Face

K=0.0

$A_4$=4.01016×10$^{-4}$ $A_6$=2.39857×10$^{-5}$ $A_8$=−1.41367×10$^{-6}$ $A_{10}$=4.90779×10$^{-8}$

Aspherical Surface: Seventeenth Face

K=0.0

$A_4$=−8.52233×10$^{-5}$ $A_6$=1.17201×10$^{-5}$ $A_8$=−4.70061×10$^{-7}$ $A_{10}$=8.05532×10$^{-9}$

The variable distance DA between the first lens group G1 and the second lens group G2, the variable distance DB between the second lens group G2 and the aperture stop S, the variable distance DC between the aperture stop S and the third lens group G3, the variable distance DD between the third lens group G3 and the fourth lens group G4, and the variable distance DE between the fourth lens group G4 and the optical filter OF are changed associated with the zooming as shown in the following table (Table 2).

TABLE 2

| | VARIABLE INTERVAL | | |
|---|---|---|---|
| | SHORT FOCUS END f = 5.156 | INTERMEDIATE FOCAL LENGTH f = 13.392 | LONG FOCUS END f = 35.091 |
| DA | 0.600 | 7.511 | 14.457 |
| DB | 6.999 | 2.145 | 0.900 |
| DC | 3.827 | 1.726 | 0.650 |
| DD | 2.579 | 3.308 | 11.981 |
| DE | 4.172 | 7.058 | 2.698 |

The vales of the parameters according to the above-described conditional expressions in this first embodiment are as follows.

Conditional Expression Values $v_d$, $\Delta\theta_{g,F}$: as described in Table 1

$f_{ap}/f_W=11.1$ $L_{a1-a2}W/L_{a1-s}W=0.566$ $L_{a1-a2}T/L_{a1-s}T=0.962$ $L_{s-a3}W/L_{a1-s}W=0.219$ $L_{s-a3}T/L_{a1-s}T=0.027$ $|R_{3R}|/f_W=0.938$ $X_1/f_T=0.356$ $X_3/f_T=0.226$ $|f_2|/f_3=0.665$ $f_1/f_W=5.81$ $d_{SW}/f_T=0.109$

Accordingly, the values of the parameters according to the above-described conditional expressions illustrated in FIG. 1 in this first embodiment are within the ranges of the conditional expressions.

Figure 6:
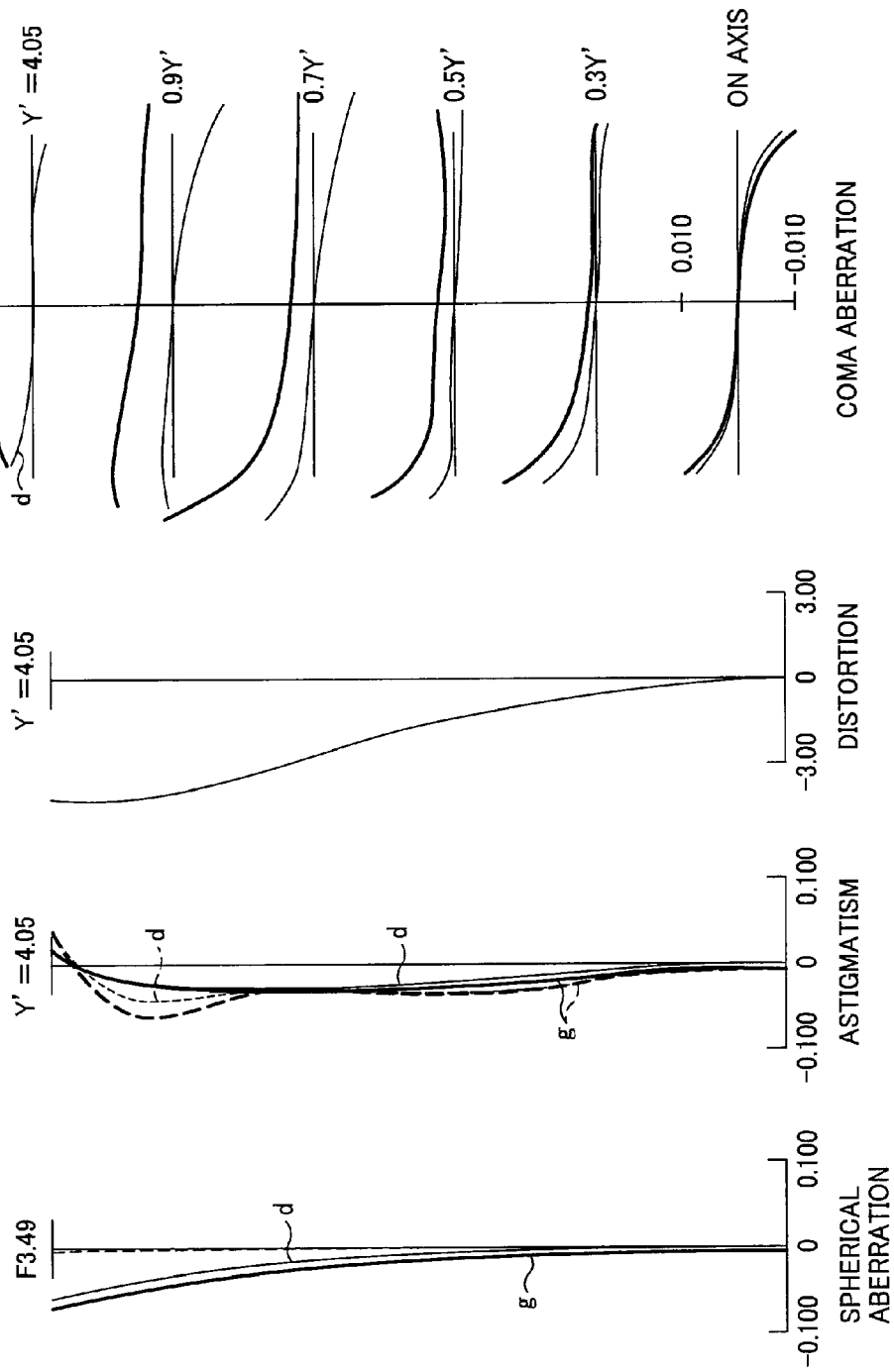
FIG. 6 is a view illustrating aberration curves at a short focus end of the zoom lens according to the first embodiment of the present invention.
Figure 7:
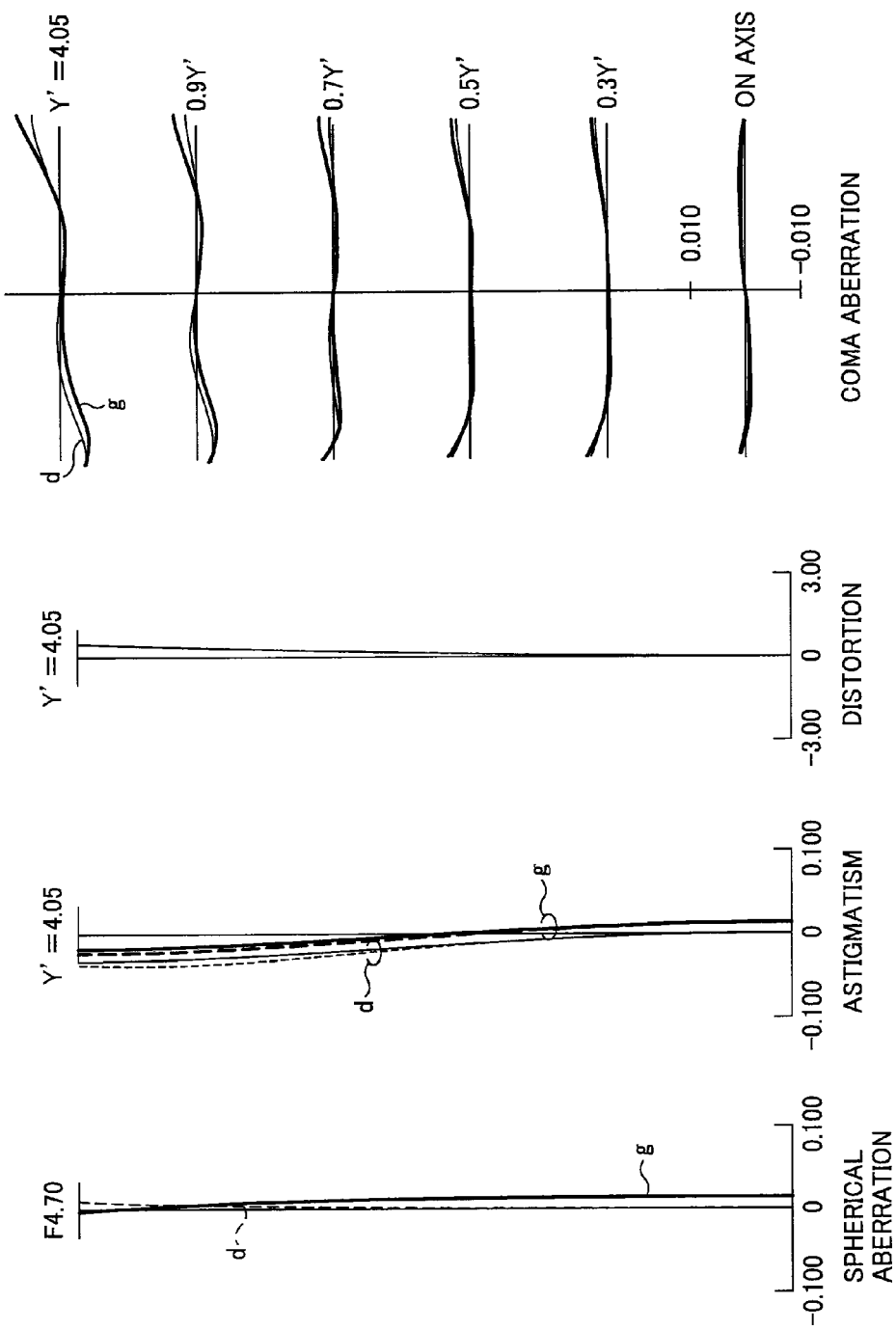
FIG. 7 is a view illustrating aberration curves in an intermediate focal length of the zoom lens according to the first embodiment of the present invention.
Figure 8:
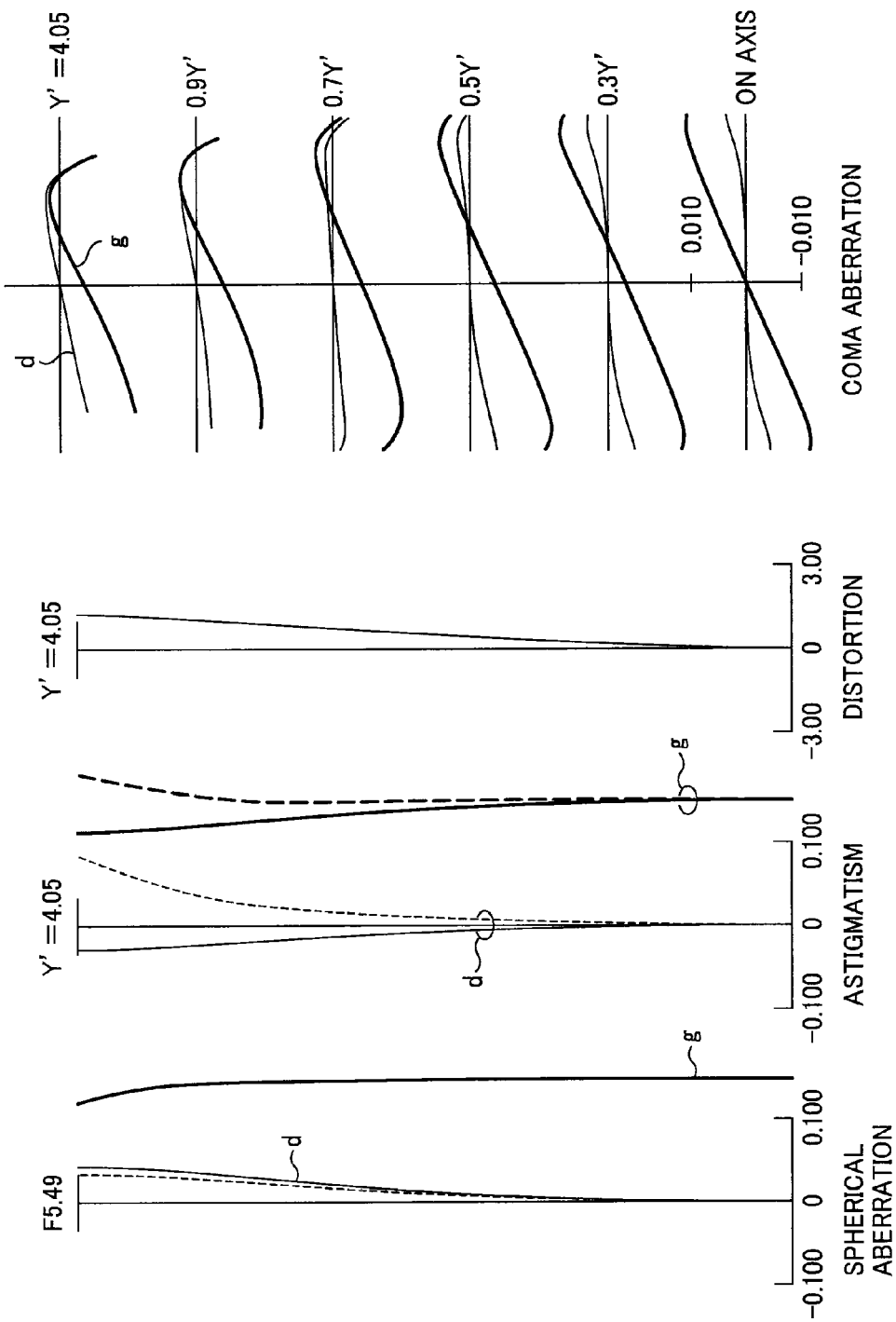
FIG. 8 is a view illustrating aberration curves at a long focus end of the zoom lens according to the first embodiment of the present invention.

FIGS. 6-8 are views illustrating aberration curves of each aberration in the zoom lens illustrated in FIG. 1 according to the first embodiment. In this case, FIG. 6 is a view illustrating the aberration curves at the wide-angle end. FIG. 7 is a view illustrating the aberration curves at the intermediate focal length. FIG. 8 is a view illustrating the aberration curves at the telephoto end.

In each of the views, the dotted line in the spherical aberration view denotes the sine condition, and the solid line in the astigmatism view denotes the sagittal and the dotted line in the astigmatism denotes the meridional.

According to the views in FIGS. 6-8, it can be seen that the aberrations are preferably corrected or controlled by the zoom lens illustrated in FIG. 1 according to the first embodiment of the present invention.

Consequently, a downsized zoom lens can be provided having four groups of positive, negative, positive and positive, which can preferably correct aberrations, a sufficient wide-angle whose half field angle at the wide-angle end is 38 degrees or more, a magnification ratio of 6.5 times or more, about 10 lenses which are a small number of lenses, and a resolution corresponding to an imaging element of 7 to 10 million pixels.

By using such a zoom lens, a downsized camera and a downsized personal digital assistant device, which can provide a high quality image, and has a variable magnification range capable of sufficiently covering a normal photographing range, can be achieved.

Second Embodiment

Figure 2:
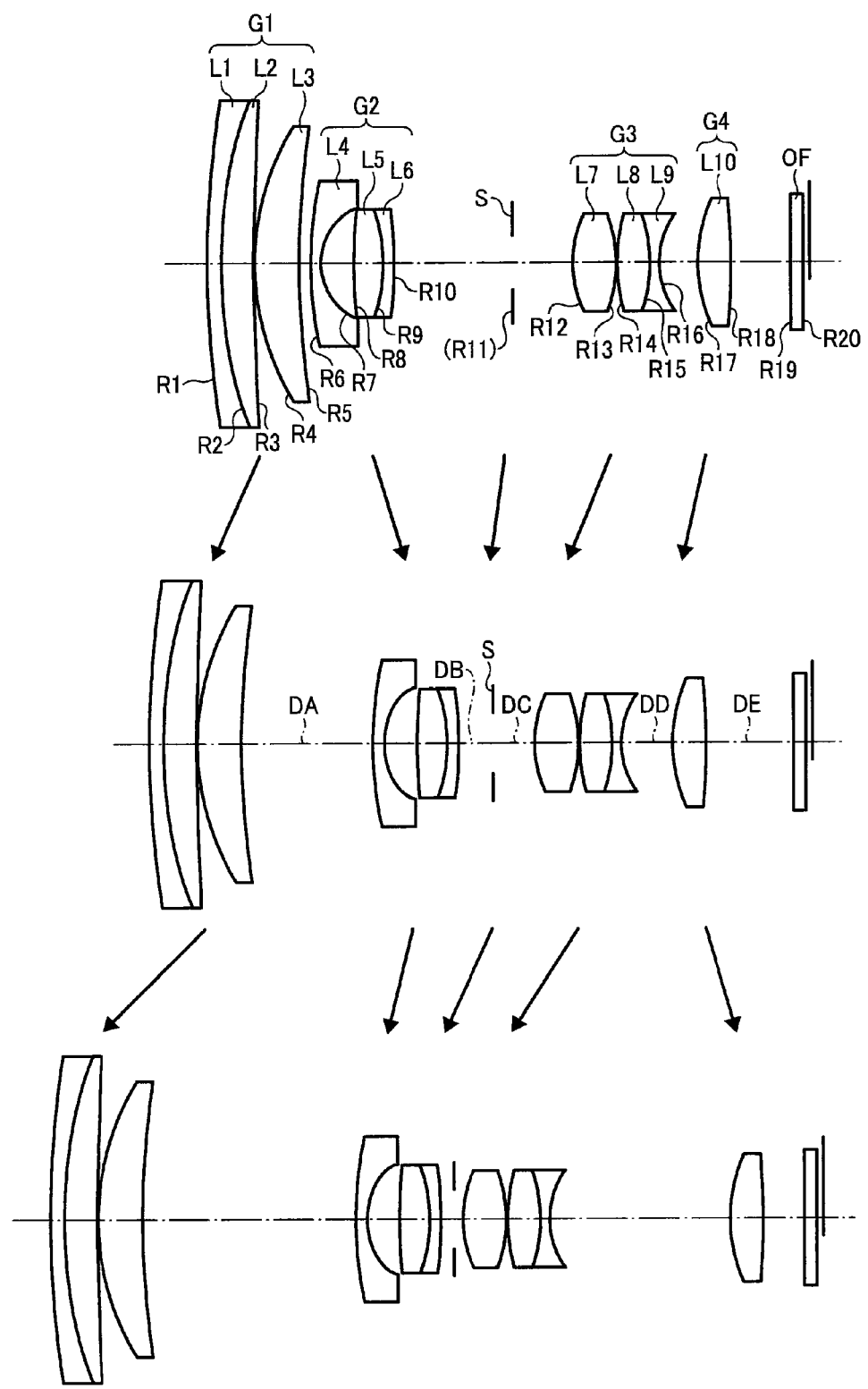
FIG. 2 is a sectional view illustrating a structure of a zoom lens according to a second embodiment of the present invention.

FIG. 2 illustrates the structure of the optical system of the zoom lens according to the second embodiment of the present invention at the short focal end (wide-angle end), the intermediate focal length, and the long focal end (telephoto end).

Since the zoom lens illustrated in FIG. 2 has the basic structure similar to that in the zoom lens illustrated in FIG. 1, the description about the structure and the operation is omitted.

In addition, in order to avoid making the description complex by the increasing the number of the reference numbers, the reference numbers used in FIG. 2 are the same as the reference numbers used in FIG. 1. However, they are not always the same.

In this second embodiment, associated with the change in the focal length from the wide-angle end to the telephoto end, a focal length of the entire system f, F-number, and a half field angle to are changed as follows.

f: 5.16-35.09
F-number: 3.49-5.49
ω: 39.32-6.53

The characteristics of each optical face are as shown in the following table (Table 3).

TABLE 3

NUMERICAL EMBODIMENT 2
f = 5.16~35.09, F = 3.49~5.49, ω = 39.32~6.53

| FACE NUMBER | R | D | $N_d$ | $v_d$ | $\Delta\theta_{g,F}$ | GLASS NAME |
|---|---|---|---|---|---|---|
| 01 | 62.142 | 1.00 | 1.92286 | 18.90 | 0.0386 | OHARA S-NPH2 |
| 02 | 33.360 | 2.32 | 1.60300 | 65.44 | 0.0045 | OHARA S-PHM53 |
| 03 | 161.521 | 0.10 | | | | |
| 04* | 16.707 | 3.01 | 1.69350 | 53.18 | −0.0072 | OHARA L-LAL13 |
| 05 | 56.749 | VARIABLE (DA) | | | | |
| 06* | 24.089 | 0.74 | 1.88300 | 40.76 | −0.0088 | OHARA S-LAH58 |
| 07 | 4.284 | 2.58 | | | | |
| 08 | 54.212 | 2.11 | 1.92286 | 18.90 | 0.0386 | OHARA S-NPH2 |
| 09 | −9.638 | 0.64 | 2.00330 | 28.27 | 0.0023 | OHARA S-LAH79 |
| 10* | −246.771 | VARIABLE (DB) | | | | |
| 11 | APERTURE STOP | VARIABLE (DC) | | | | |
| 12* | 6.779 | 3.01 | 1.58913 | 61.15 | −0.0043 | OHARA L-BAL35 |
| 13* | −10.058 | 0.10 | | | | |
| 14 | 11.013 | 2.15 | 1.60300 | 65.44 | 0.0045 | OHARA S-PHM53 |
| 15 | −8.482 | 0.60 | 1.68893 | 31.07 | 0.0074 | OHARA S-TIM28 |
| 16 | 4.896 | VARIABLE (DD) | | | | |
| 17* | 11.622 | 2.20 | 1.52470 | 56.20 | | OPTICAL PLASTIC |
| 18 | −149.999 | VARIABLE (DE) | | | | |
| 19 | ∞ | 0.80 | 1.51680 | 64.20 | | VARIOUS FILTERS |
| 20 | ∞ | | | | | |

The optical surfaces of the fourth, sixth, tenth, twelfth, thirteenth and seventeenth faces in Table 3 are aspherical surfaces. The parameters according to the expression illustrating the above-described aspherical surface shape in each aspherical surface are as follows.

Aspherical Surface: Fourth Face $K=0.0$ $A_4=-4.49172 \times 10^{-6}$ $A_6=-1.89922 \times 10^{-8}$ $A_8=-2.51390 \times 10^{-11}$ $A_{10}=-3.42764 \times 10^{-13}$ Aspherical Surface: Sixth Face $K=0.0$ $A_4=4.22736 \times 10^{-5}$ $A_6=-3.36978 \times 10^{-6}$ $A_8=2.28125 \times 10^{-7}$ $A_{10}=-7.59455 \times 10^{-9}$ $A_{12}=8.48001 \; 10^{-11}$ Aspherical Surface: Tenth Face $K=0.0$ $A_4=-4.35735 \times 10^{-4}$ $A_6=-1.90121 \times 10^{-6}$ $A_8=-3.37380 \times 10^{-7}$ $A_{10}=-3.96486 \times 10^{-8}$ Aspherical Surface: Twelfth Face $K=0.0$ $A_4=-6.85996 \times 10^{-4}$ $A_6=1.46020 \times 10^{-5}$ $A_8=-9.03857 \times 10^{-7}$ $A_{10}=3.76431 \times 10^{-8}$ Aspherical Surface: Thirteenth Face $K=0.0$ $A_4=3.36919 \times 10^{-4}$ $A_6=2.03718 \times 10^{-5}$ $A_8=-1.32828 \times 10^{-6}$ $A_{10}=5.88476 \times 10^{-8}$ Aspherical Surface: Seventeenth Face $K=0.0$ $A_4=-9.17625 \times 10^{-5}$ $A_6=1.09530 \times 10^{-5}$ $A_8=-4.30254 \times 10^{-7}$ $A_{10}=7.41524 \times 10^{-9}$ The variable distance DA between the first lens group G1 and the second lens group G2, the variable distance DB between the second lens group G2 and the aperture stop S, the variable distance DC between the aperture stop S and the third lens group G3, the variable distance DD between the third lens group G3 and the fourth lens group G4, and the variable distance DE between the fourth lens group G4 and the optical filter OF are changed associated with the zooming as shown in the following table (Table 4).

TABLE 4

| | VARIABLE INTERVAL | | |
|---|---|---|---|
| | SHORT FOCUS END $f = 5.161$ | INTERMEDIATE FOCAL LENGTH $f = 13.401$ | LONG FOCUS END $f = 35.086$ |
| DA | 0.600 | 9.311 | 15.020 |
| DB | 8.327 | 2.425 | 0.900 |
| DC | 4.222 | 2.937 | 0.650 |
| DD | 2.849 | 3.756 | 12.816 |
| DE | 4.209 | 6.170 | 2.925 |

The values of the parameters according to the above-described conditional expressions in the second embodiment are as follows.

Conditional Expression Values $\nu_d, \Delta\theta_{g,F}$: as described in Table 3

$f_{ap}/f_W=13.4$ $L_{a1-a2}W/L_{a1-s}W=0.538$ $L_{a1-a2}T/L_{a1-s}T=0.964$ $L_{s-a3}W/L_{a1-s}W=0.234$ $L_{s-a3}T/L_{a1-s}T=0.026$ $|R_{3R}|/f_W=0.949$ $X_1/f_T=0.345$ $X_3/f_T=0.247$ $|f_2|/f_3=0.686$ $f_1/f_W=6.17$ $d_{SW}/f_T=0.120$

Accordingly, the values of the parameters according to the above-described conditional expressions in this second embodiment are within the conditional expression ranges.

Figure 9:
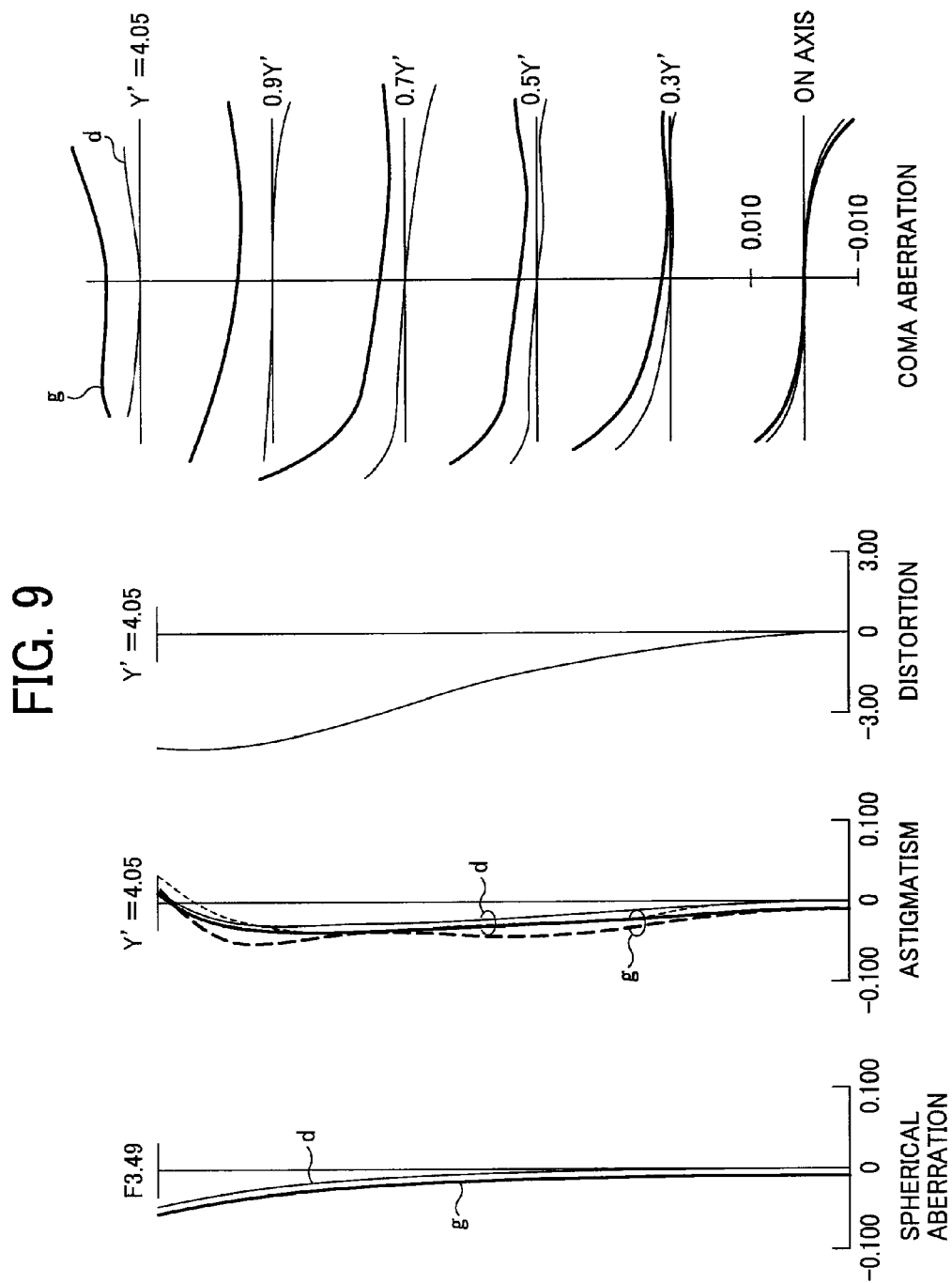
FIG. 9 is a view illustrating aberration curves at a short focus end of the zoom lens according to the second embodiment of the present invention.
Figure 10:
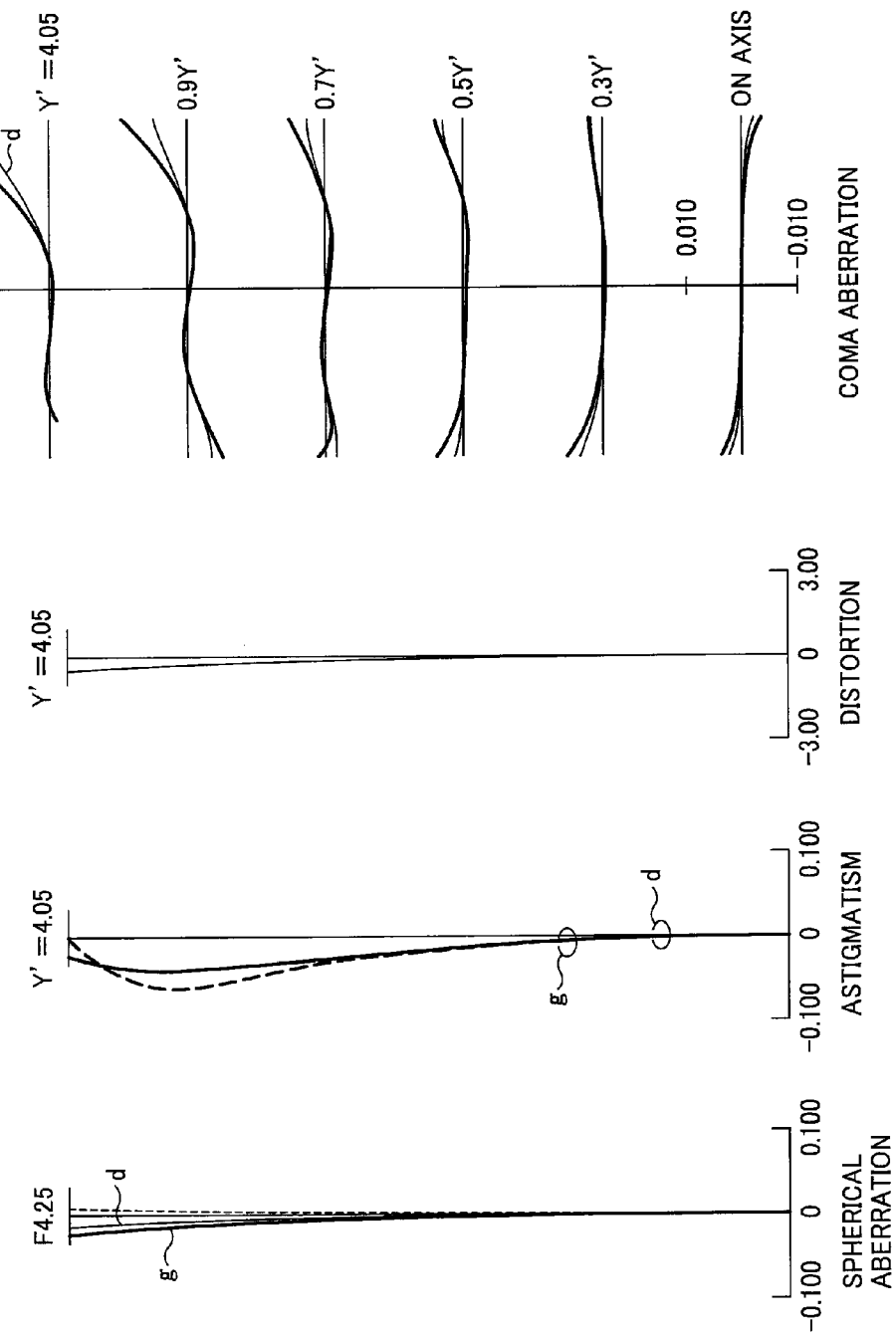
FIG. 10 is a view illustrating aberration curves in an intermediate focal length of the zoom lens according to the second embodiment of the present invention.
Figure 11:
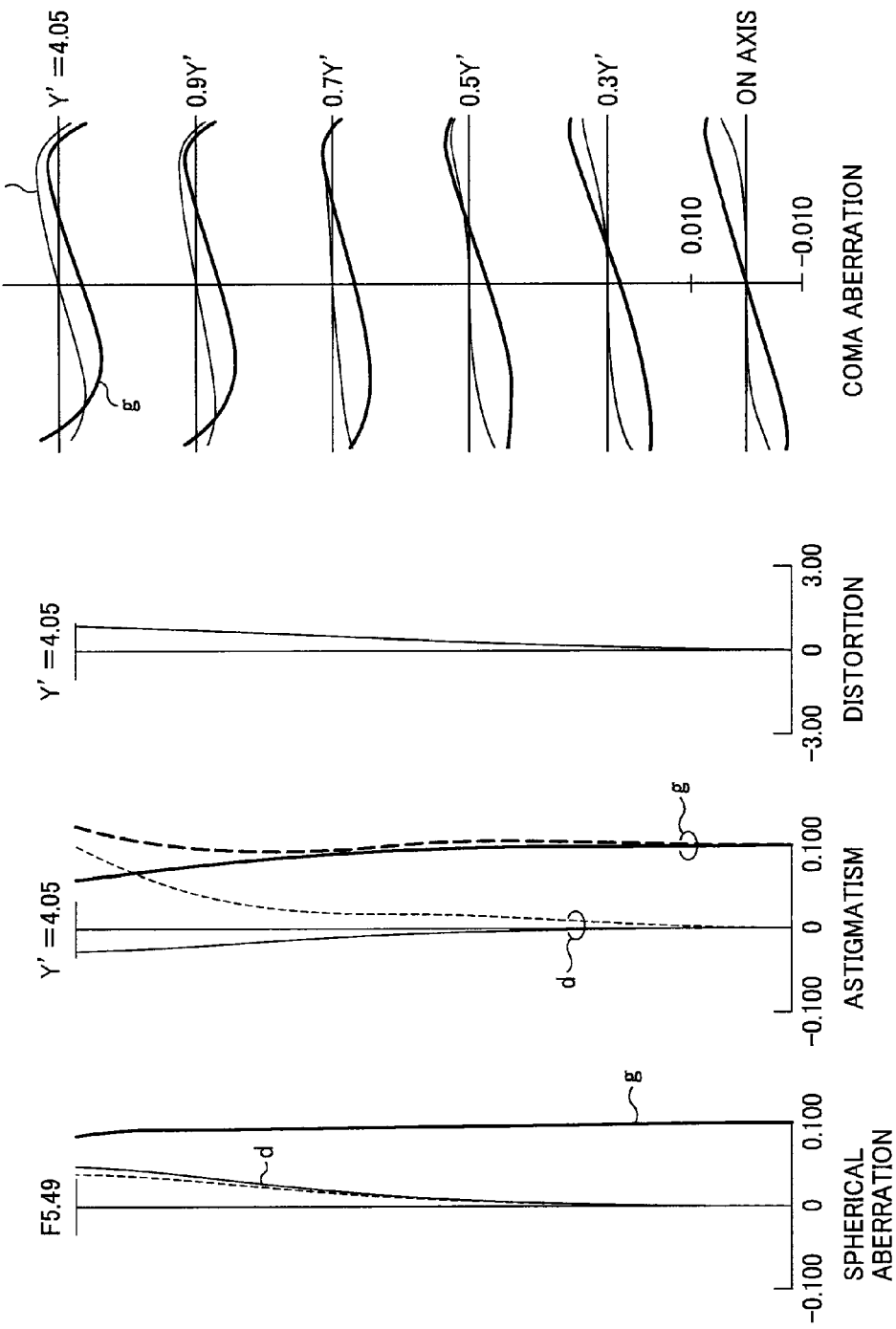
FIG. 11 is a view illustrating aberration curves at a long focus end of the zoom lens according to the second embodiment of the present invention.

FIGS. 9-11 are views illustrating the aberrations in the zoom lens illustrated in FIG. 2 according to the second embodiment. FIG. 9 illustrates the aberration curves at the wide-angle end. FIG. 10 illustrates the aberration curves at the intermediate focal length. FIG. 11 illustrates the aberration curves at the telephoto end.

In the views, the dotted line in the spherical aberration view illustrates the sine condition, and the solid line in the astigmatism illustrates the sagittal and the dotted line in the astigmatism illustrates the meridional.

According to the aberration curves in FIGS. 9-11, it can be seen that the aberrations are preferably corrected or controlled by the zoom lens having the structure illustrated in FIG. 2 according to the second embodiment of the present invention.

Consequently, a downsized zoom lens can be provided having (he four groups of positive, negative, positive and positive, which can preferably correct aberrations, a sufficient wide-angle whose half field angle at the wide-angle end is 38 degrees or more, a magnification ratio of 6.5 times or more, about 10 lenses which are a small number of lenses, and a resolution corresponding to an imaging element of 7 to 10 million pixels.

By using such a zoom lens, a downsized camera and a downsized personal digital assistant device, which can provide a high quality image, and has a variable magnification range capable of sufficiently covering a normal photographing range, can be achieved.

Third Embodiment

Figure 3:
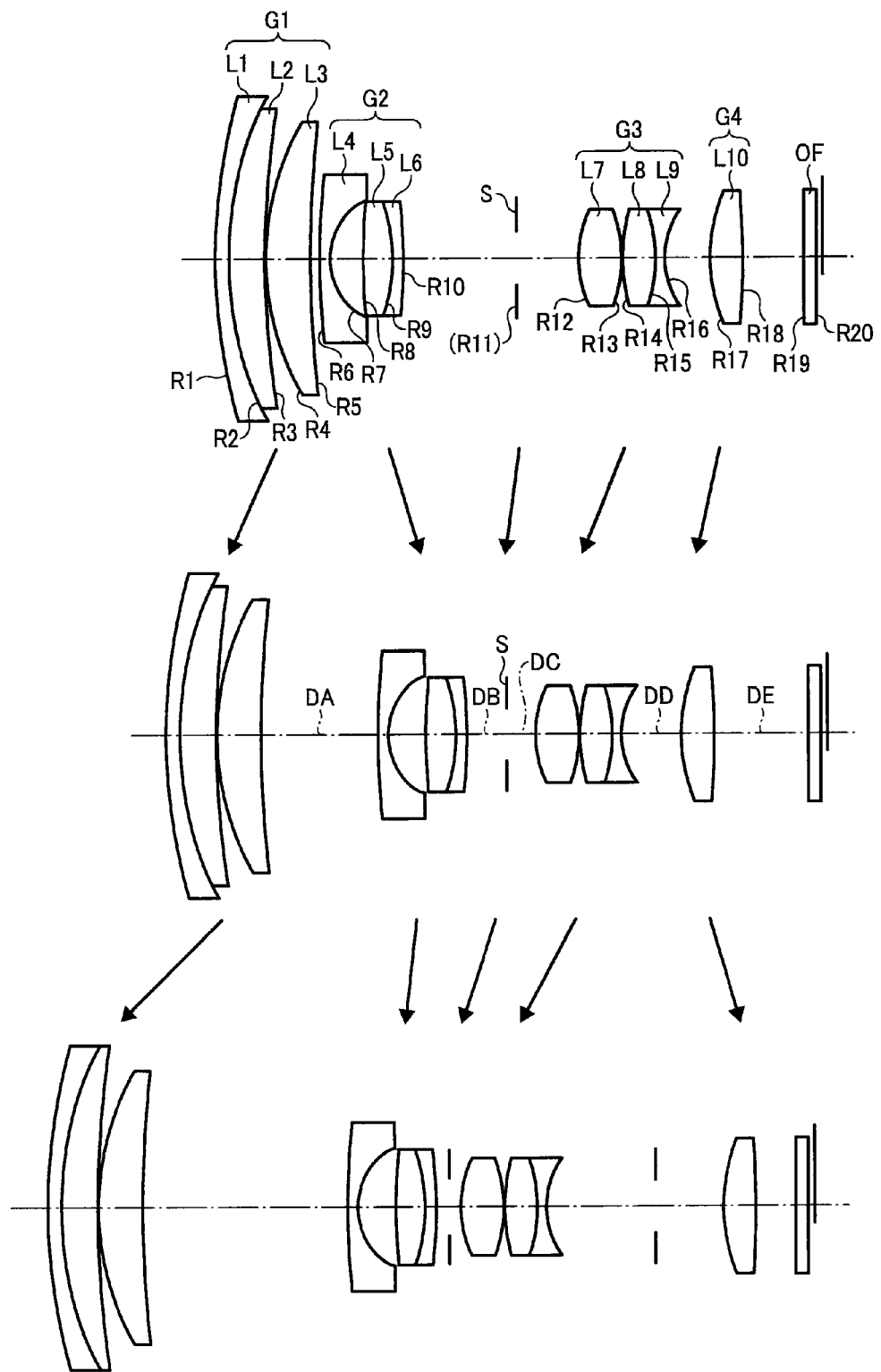
FIG. 3 is a sectional view illustrating a structure of a zoom lens according to a third embodiment of the present invention.

FIG. 3 illustrates the structure of the optical system of the zoom lens according to the third embodiment at the short focus end (wide-angle end), the intermediate focal length, the long focal end (telephoto end).

Since the zoom lens illustrated in FIG. 3 has the basic structure similar to that in the zoom lens illustrated in FIG. 1, the description about the structure and the operation will be omitted.

In this third embodiment, associated with the change in the focal length from the wide-angle end to the telephoto end, a focal length of the entire system f, F-number, and a half field angle ω are changed as follows.

f: 5.16-35.09
F-number: 3.50-5.29
ω: 39.323-6.50

The characteristics of each optical surface are as shown in the following table (Table 5).

$A_8 = 9.87125 \times 10^{-11}$ $A_{10} = -7.57988 \times 10^{-13}$

Aspherical Surface: Sixth Face $K = 0.0$ $A_4 = 1.45622 \times 10^{-4}$ $A_6 = -6.88560 \times 10^{-6}$ $A_8 = 3.08656 \times 10^{-7}$ $A_{10} = -6.72175 \times 10^{-9}$ $A_{12} = -4.03500 \times 10^{-11}$ $A_{14} = 2.26201 \times 10^{-12}$ Aspherical Surface: Tenth Face $K = 0.0$ $A_4 = -4.85100 \times 10^{-4}$ $A_6 = -5.63898 \times 10^{-6}$ $A_8 = -4.17876 \times 10^{-7}$ $A_{10} = -5.85888 \times 10^{-8}$ Aspherical Surface: Twelfth Face $K = 0.0$ $A_4 = -7.23884 \times 10^{-4}$

TABLE 5

NUMERICAL EMBODIMENT 3
f = 5.16~35.09, F = 3.50~5.29, ω = 39.33~6.50

| FACE NUMBER | R | D | $N_d$ | $v_d$ | $\Delta\theta_{g,F}$ | GLASS NAME |
|---|---|---|---|---|---|---|
| 01 | 34.106 | 1.00 | 1.92286 | 18.90 | 0.0386 | OHARA S-NPH2 |
| 02 | 22.338 | 2.52 | 1.49700 | 81.54 | 0.0280 | OHARA S-FPL51 |
| 03 | 68.165 | 0.10 | | | | |
| 04* | 17.768 | 2.96 | 1.77250 | 49.60 | −0.0092 | OHARA S-LAH66 |
| 05 | 74.325 | VARIABLE (DA) | | | | |
| 06* | 49.603 | 0.74 | 1.88300 | 40.76 | −0.0088 | OHARA S-LAH58 |
| 07 | 4.176 | 2.23 | | | | |
| 08 | 35.227 | 2.01 | 1.92286 | 18.90 | 0.0386 | OHARA S-NPH2 |
| 09 | −10.624 | 0.64 | 2.00330 | 28.27 | 0.0023 | OHARA S-LAH79 |
| 10* | −185.754 | VARIABLE (DB) | | | | |
| 11 | APERTURE STOP | VARIABLE (DC) | | | | |
| 12* | 6.511 | 3.04 | 1.58913 | 61.15 | −0.0043 | OHARA L-BAL35 |
| 13* | −9.504 | 0.10 | | | | |
| 14 | 12.106 | 2.15 | 1.60300 | 65.44 | 0.0045 | OHARA S-PHM53 |
| 15 | −7.815 | 0.60 | 1.68893 | 31.07 | 0.0074 | OHARA S-TIM28 |
| 16 | 4.839 | VARIABLE (DD) | | | | |
| 17* | 11.724 | 2.19 | 1.52470 | 56.20 | | OPTICAL PLASTIC |
| 18 | −50.041 | VARIABLE (DE) | | | | |
| 19 | ∞ | 0.80 | 1.51680 | 64.20 | | VARIOUS FILTERS |
| 20 | ∞ | | | | | |

The optical surfaces of the fourth, sixth, tenth, twelfth, thirteenth and seventeenth surfaces in Table 5 are aspherical surfaces. The parameters according to the expression illustrating the above-described aspherical surface shape in each aspherical surface are as follows.

Aspherical Surface: Fourth Face $K = 0.0$ $A_4 = -3.86254 \times 10^{-6}$ $A_6 = -2.31255 \times 10^{-8}$ $A_6 = 1.77639 \times 10^{-5}$ $A_8 = -9.37789 \times 10^{-7}$ $A_{10} = 5.36548 \times 10^{-8}$ Aspherical Surface: Thirteenth Face $K = 0.0$ $A_4 = 4.78008 \times 10^{-4}$ $A_6 = 2.52291 \times 10^{-5}$ $A_8 = -1.67212 \times 10^{-6}$ $A_{10} = 9.81679 \times 10^{-8}$ Aspherical Surface: Seventeenth Surface $K = 0.0$ $A_4 = -5.42838 \times 10^{-5}$ $A_6 = 9.52406 \times 10^{-5}$ $A_8 = -3.66158 \times 10^{-7}$ $A_{10} = 6.05533 \times 10^{-9}$ The variable distance DA between the first lens group G1 and the second lens group G2, the variable distance DB between the second lens group G2 and the aperture stop S, the variable distance DC between the aperture stop S and the third lens group G3, the variable distance DD between the third lens group G3 and the fourth lens group G4, and the variable distance DE between the fourth lens group G4 and the optical filter OF are changed with the zooming as shown in the following table (Table 6).

TABLE 6

VARIABLE INTERVAL

|    | SHORT FOCUS END f = 5.157 | INTERMEDIATE FOCAL LENGTH f = 13.392 | LONG FOCUS END f = 35.087 |
|----|---------------------------|--------------------------------------|---------------------------|
| DA | 0.600                     | 8.196                                | 14.320                    |
| DB | 7.656                     | 2.754                                | 0.900                     |
| DC | 4.111                     | 1.968                                | 0.650                     |
| DD | 2.940                     | 3.922                                | 11.857                    |
| DE | 4.155                     | 6.416                                | 2.844                     |

The values of the parameters according to the above-described conditional expressions in the third embodiment are as follows.

Conditional Expression Values $\nu_d, \Delta\theta_{g,F}$: as described in Table 5

$f_{ap}/f_W = 12.7$ $L_{a1-a2}W/L_{a1-s}W = 0.545$ $L_{a1-a2}T/L_{a1-s}T = 0.962$ $L_{s-a3}W/L_{a1-s}W = 0.244$ $L_{s-a3}T/L_{a1-s}T = 0.027$ $|R_{3R}|/f_W = 0.938$ $X_1/f_T = 0.317$ $X_3/f_T = 0.217$ $|f_2|/f_3 = 0.657$ $f_1/f_W = 5.69$ $d_{SW}/f_T = 0.117$

Accordingly, the values of the parameters according to the above-described conditional expressions in the third embodiment are within the conditional expression ranges.

Figure 12:
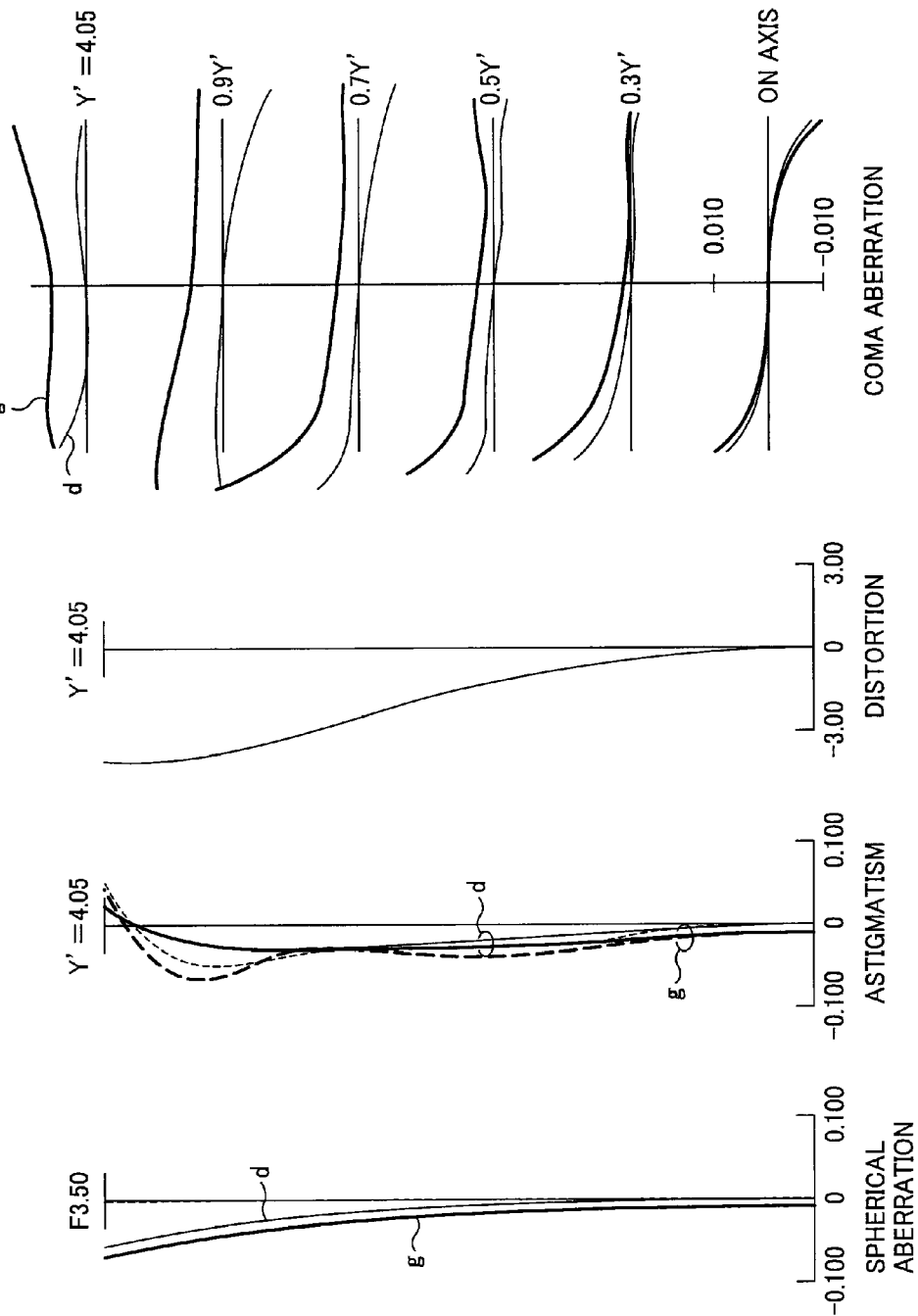
FIG. 12 is a view illustrating aberration curves at a short focus end of the zoom lens according to the third embodiment of the present invention.
Figure 13:
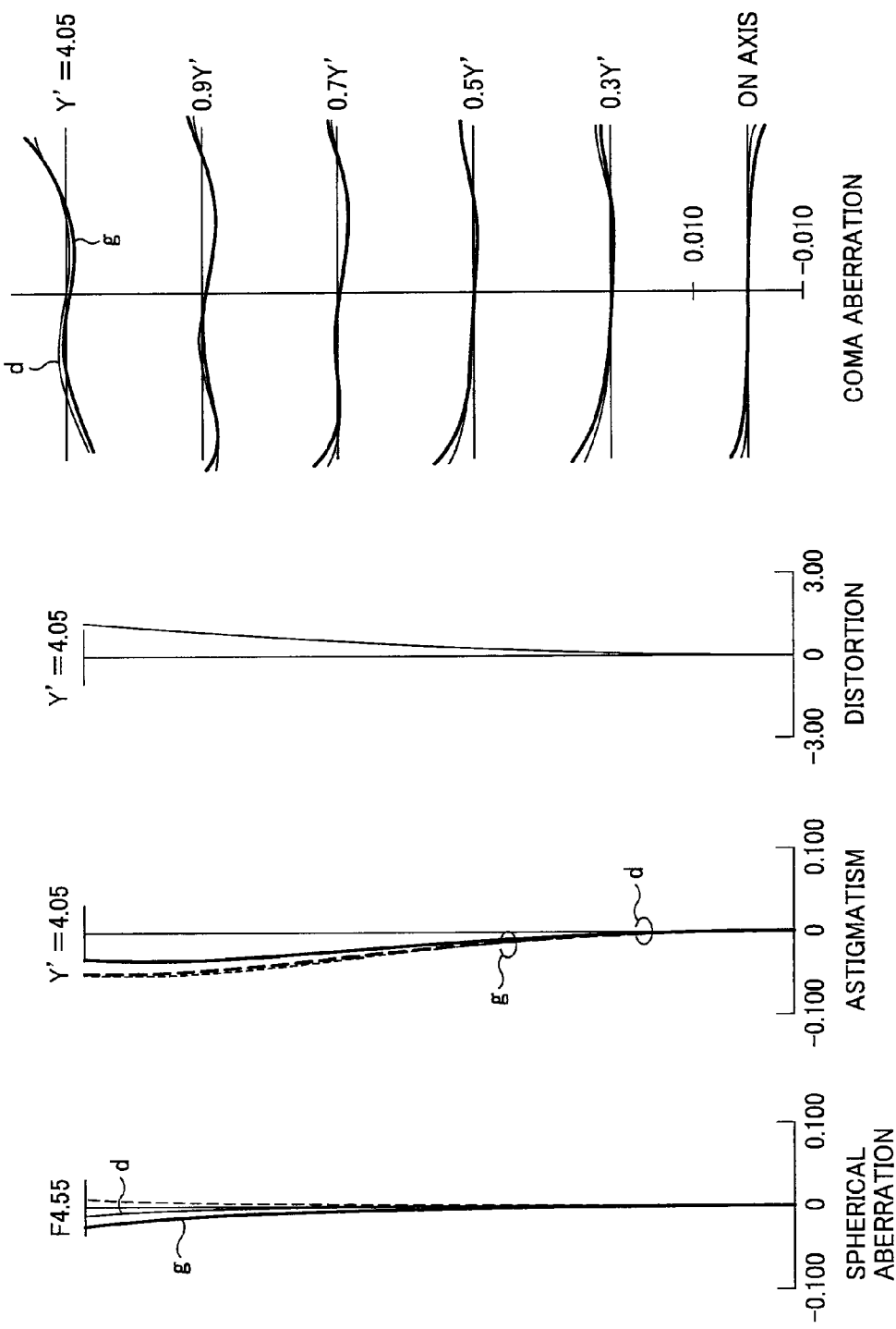
FIG. 13 is a view illustrating aberration curves in an intermediate focal length of the zoom lens according to the third embodiment of the present invention.
Figure 14:
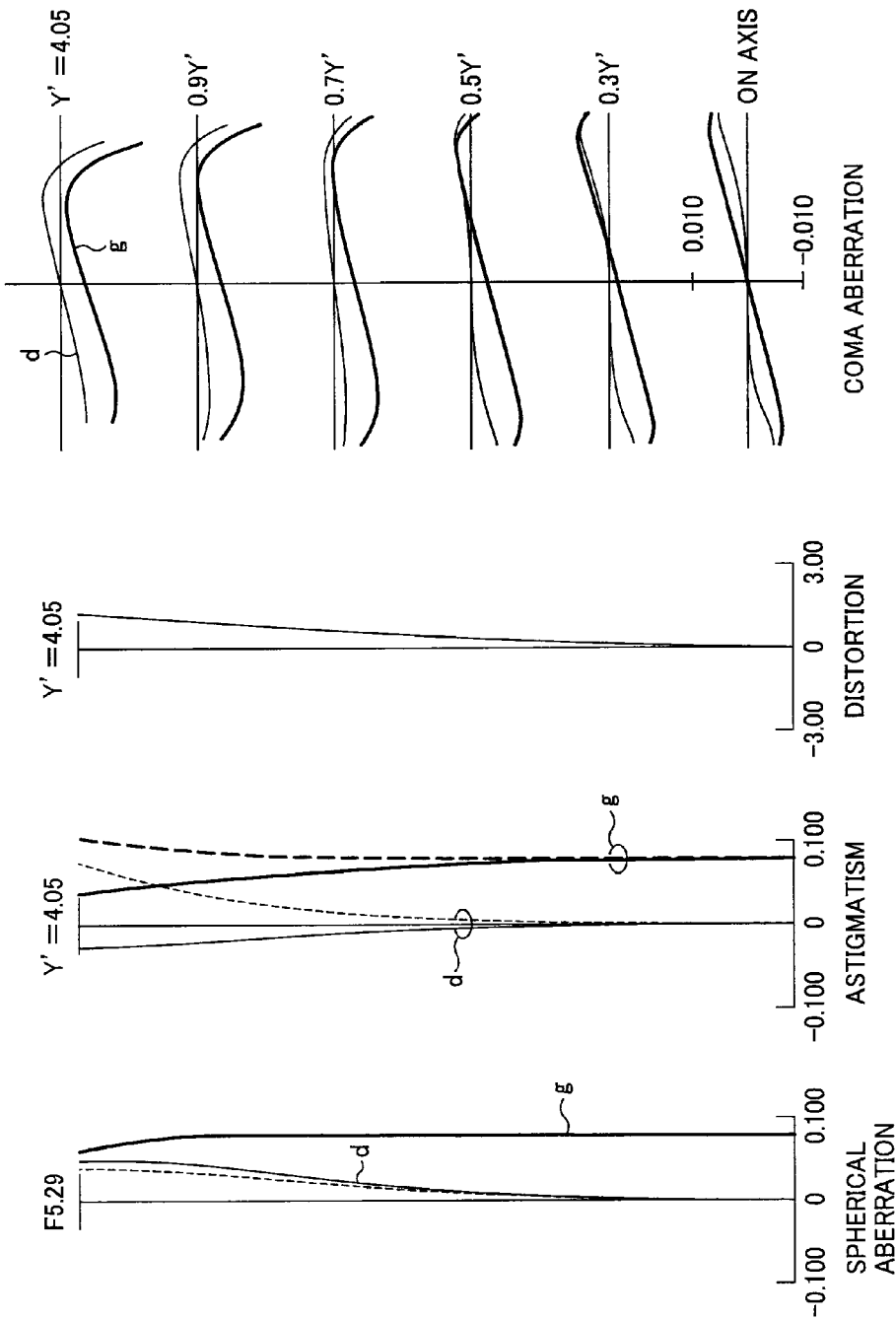
FIG. 14 is a view illustrating aberration curves at a long focus end of the zoom lens according to the third embodiment of the present invention.

FIGS. 12-14 are views illustrating the aberration curves of each aberration in the zoom lens illustrated in FIG. 3 according to the third embodiment. In this case, FIG. 12 is a view illustrating the aberration curves at the wide-angle end. FIG. 13 is a view illustrating the aberration curves at the intermediate focal length. FIG. 14 is a view illustrating the aberration curves at the telephoto end.

In each of the views, the dotted line in the spherical aberration view denotes the sine condition, and the solid line in the astigmatism view denotes the sagittal and the dotted line in the astigmatism view denotes the meridional.

According to the views in FIGS. 12-14, it can be seen that the aberrations are preferably corrected or controlled by the zoom lens illustrated in FIG. 3 according to the third embodiment of the present invention.

Consequently, a downsized zoom lens can be provided having the four groups of positive, negative, positive and positive, which can preferably correct aberrations, a sufficient wide-angle whose half field angle at the wide-angle end is 38 degrees or more, a magnification ratio of 6.5 times or more, about 10 lenses which are a small number of lenses, and a resolution corresponding to an imaging element of 7 to 10 million pixels.

By using such a zoom lens, a downsized camera and a downsized personal digital assistant device, which can provide a high quality image, and has a variable magnification range capable of sufficiently covering a normal photographing range, can be achieved.

Fourth Embodiment

Figure 4:
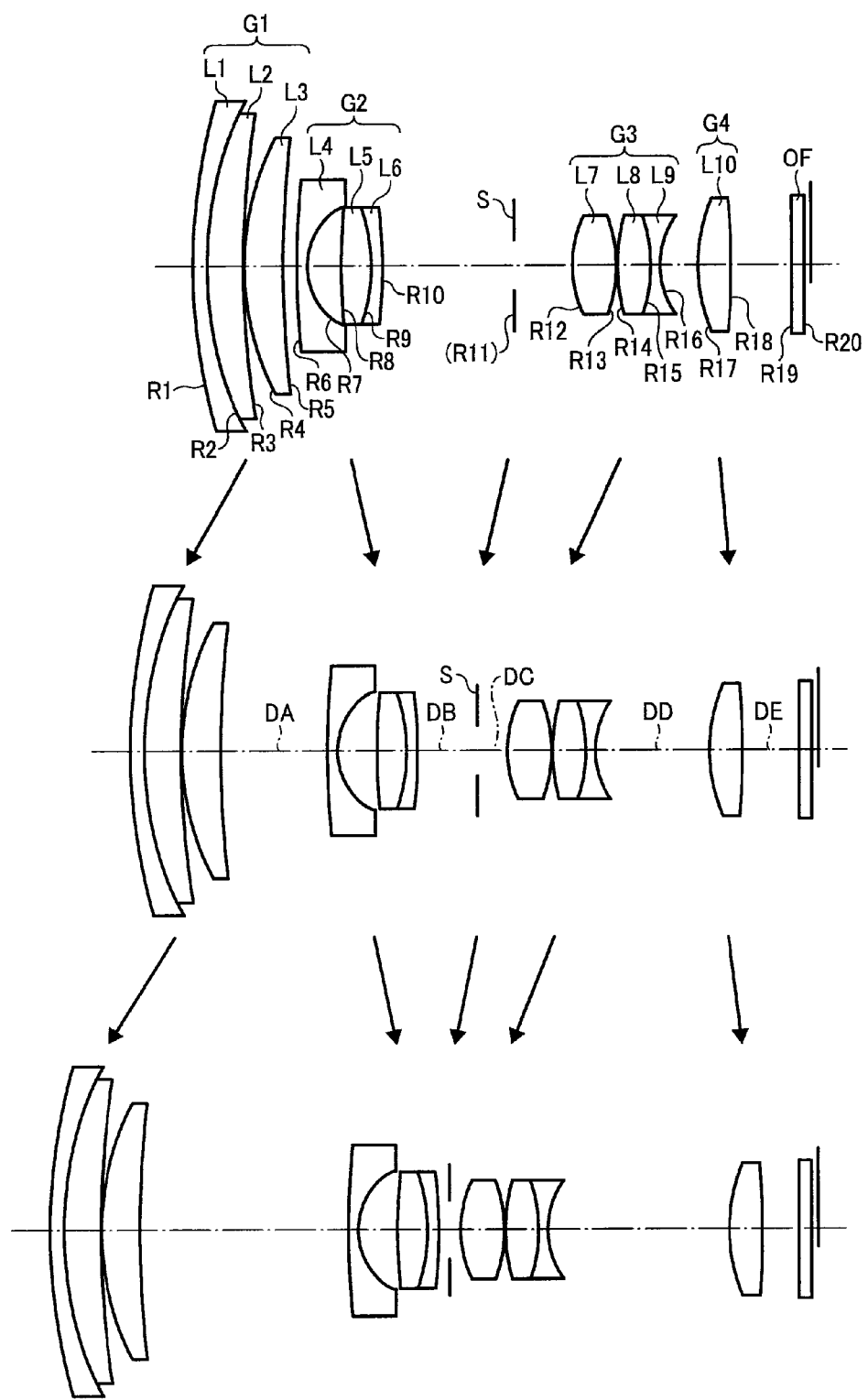
FIG. 4 is a sectional view illustrating a structure of a zoom lens according to a fourth embodiment of the present invention.

FIG. 4 illustrates the structure of the optical system of the zoom lens according to the fourth embodiment of the present invention at the short focus end (wide-angle end), the intermediate focal length, the long focal end (telephoto end) according to the fourth embodiment of the present invention.

Since the zoom lens illustrated in FIG. 4 has the basic structure similar to that in the zoom lens illustrated in FIG. 1, the description about the structure and the operation will be omitted.

In this fourth embodiment, associated with the change in the focal length from the wide-angle end to the telephoto end, a focal length of the entire system f, F-number, and a half field angle ω are changed as follows.

f: 5.16-35.10
F-number: 3.51-5.52
ω: 39.31-6.56

The characteristics of each optical surface are as shown in the following table (Table 7).

TABLE 7

NUMERICAL EMBODIMENT 4
f = 5.16~35.10, F = 3.51~5.52, ω = 39.31~6.56

| FACE NUMBER | R      | D    | $N_d$   | $\nu_d$ | $\Delta\theta_{g,F}$ | GLASS NAME     |
|-------------|--------|------|---------|---------|----------------------|----------------|
| 01          | 36.191 | 1.00 | 1.92286 | 18.90   | 0.0386               | OHARA S-NPH2   |
| 02          | 23.366 | 2.65 | 1.60300 | 65.44   | 0.0045               | OHARA S-PHM53  |
| 03          | 69.009 | 0.10 |         |         |                      |                |

TABLE 7-continued

NUMERICAL EMBODIMENT 4
f = 5.16~35.10, F = 3.51~5.52, ω = 39.31~6.56

| FACE NUMBER | R | D | $N_d$ | $v_d$ | $\Delta\theta_{g,F}$ | GLASS NAME |
|---|---|---|---|---|---|---|
| 04* | 18.957 | 2.62 | 1.74320 | 49.29 | −0.0088 | OHARA L-LAM60 |
| 05 | 63.794 | VARIABLE (DA) | | | | |
| 06* | 42.752 | 0.74 | 1.88300 | 40.76 | −0.0088 | OHARA S-LAH58 |
| 07 | 4.611 | 2.52 | | | | |
| 08 | 41.547 | 2.14 | 1.92286 | 18.90 | 0.0386 | OHARA S-NPH2 |
| 09 | −11.153 | 0.73 | 2.00330 | 28.27 | 0.0023 | OHARA S-LAH79 |
| 10* | −412.734 | VARIABLE (DB) | | | | |
| 11 | APERTURE STOP | VARIABLE (DC) | | | | |
| 12* | 7.136 | 3.29 | 1.58913 | 61.15 | −0.0043 | OHARA L-BAL35 |
| 13* | −10.206 | 0.10 | | | | |
| 14 | 9.909 | 2.12 | 1.60300 | 65.44 | 0.0045 | OHARA S-PHM53 |
| 15 | −9.538 | 0.60 | 1.68893 | 31.07 | 0.0074 | OHARA S-TIM28 |
| 16 | 4.859 | VARIABLE (DD) | | | | |
| 17* | 19.482 | 2.10 | 1.52470 | 56.20 | | OPTICAL PLASTIC |
| 18 | −26.355 | VARIABLE (DE) | | | | |
| 19 | ∞ | 0.80 | 1.51680 | 64.20 | | VARIOUS FILTERS |
| 20 | ∞ | | | | | |

The optical surfaces of the fourth, sixth, tenth, twelfth, thirteenth and seventeenth surfaces attached with "*" in Table 7 are aspherical surfaces. The parameters according to the expression illustrating the above-described aspherical surface shape in each aspherical surface arc as follows.

Aspherical Surface; Fourth Face $K=0.0$ $A_4=-2.37737 \times 10^{-6}$ $A_6=-1.32783 \times 10^{-8}$ $A_8=4.71055 \times 10^{-11}$ $A_{10}=-3.79840 \times 10^{-13}$ Aspherical Surface: Sixth Face $K=0.0$ $A_4=5.31335 \times 10^{-5}$ $A_6=-3.39028 \times 10^{-6}$ $A_8=1.84162 \times 10^{-7}$ $A_{10}=-5.02309 \times 10^{-9}$ $A_{12}=4.90722 \times 10^{-11}$ Aspherical Surface: Tenth Face $K=0.0$ $A_4=-3.82769 \times 10^{-4}$ $A_6=-4.86262 \times 10^{-6}$ $A_8=8.55590 \times 10^{-8}$ $A_{10}=-3.09753 \times 10^{-8}$ Aspherical Surface: Twelfth Face $K=0.0$ $A_4=-5.46320 \times 10^{-4}$ $A_6=1.08094 \times 10^{-5}$ $A_8=-5.68446 \times 10^{-7}$ $A_{10}=1.87292 \times 10^{-8}$ Aspherical Surface: Thirteenth Face $K=0.0$ $A_4=4.18671 \times 10^{-4}$ $A_6=8.36986 \times 10^{-6}$ $A_8=-8.57805 \times 10^{-8}$ $A_{10}=-1.45620 \times 10^{-9}$ Aspherical Surface: Seventeenth Face $K>0.0$ $A_4=2.54680 \times 10^{-4}$ $A_6=1.91839 \times 10^{-6}$ $A_8=-1.47697 \times 10^{-7}$ $A_{10}=3.98032 \times 10^{-9}$ Aspherical Surface: Eighteenth Face $K=-52.73201$ The variable distance DA between the first lens group G1 and the second lens group G2, the variable distance DB between the second lens group G2 and the aperture stop S, the variable distance DC between the aperture stop S and the third lens group G3, the variable distance DD between the third lens group G3 and the fourth lens group G4, and the variable distance DE between the fourth lens group G4 and the optical filter OF are changed with the zooming as the following table (Table 8).

TABLE 8

| | VARIABLE INTERVAL | | |
|---|---|---|---|
| | SHORT FOCUS END f = 5.159 | INTERMEDIATE FOCAL LENGTH f = 13.390 | LONG FOCUS END f = 35.104 |
| DA | 0.859 | 7.854 | 15.020 |
| DB | 9.233 | 4.134 | 0.900 |

TABLE 8-continued

| | VARIABLE INTERVAL | | |
|---|---|---|---|
| | SHORT FOCUS END f = 5.159 | INTERMEDIATE FOCAL LENGTH f = 13.390 | LONG FOCUS END f = 35.104 |
| DC | 4.072 | 2.164 | 0.650 |
| DD | 2.756 | 8.193 | 12.922 |
| DE | 4.358 | 4.001 | 2.629 |

The values of the parameters according to the above-described conditional expressions in the fourth embodiment are as follows.

Conditional Expression Values $v_d$, $\Delta\theta_{g,F}$: as described in Table 7

$$f_{ap}/f_W=11.1$$

$$L_{a1-a2}W/L_{a1-s}W=0.510$$

$$L_{a1-a2}T/L_{a1-s}T=0.964$$

$$L_{s-a3}W/L_{a1-s}W=0.216$$

$$L_{s-a3}T/L_{a1-s}T=0.026$$

$$|R_{3R}|/f_W=0.942$$

$$X_1/f_T=0.309$$

$$X_3/f_T=0.240$$

$$|f_2|/f_3=0.701$$

$$f_1/f_W=6.27$$

$$d_{SW}/f_T=0.116$$

Accordingly, the values of the parameters according to the above-described conditional expressions in the fourth embodiment are within the conditional expression ranges.

Figure 15:
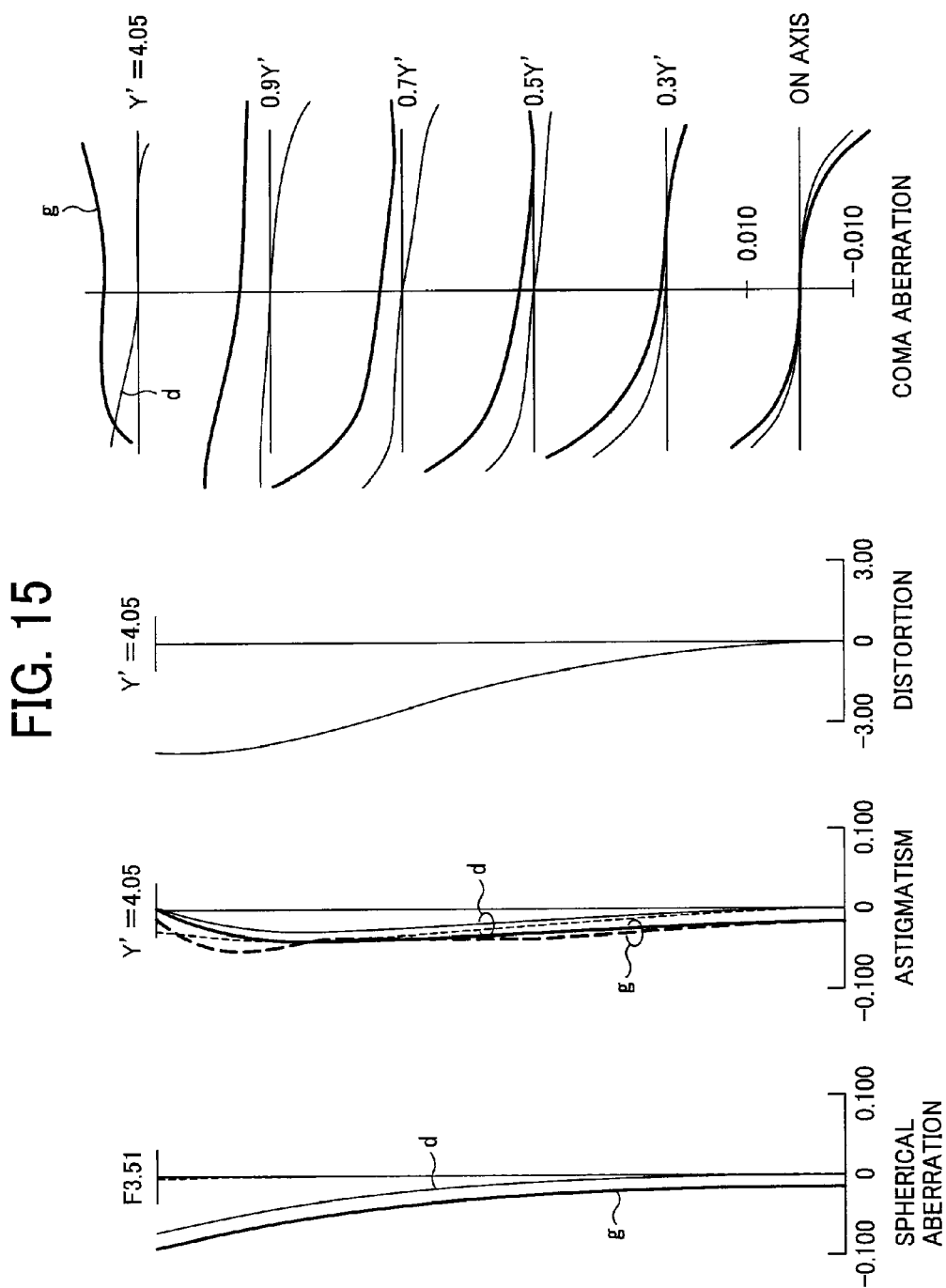
FIG. 15 is a view illustrating aberration curves at a short focus end of the zoom lens according to the fourth embodiment of the present invention.
Figure 17:
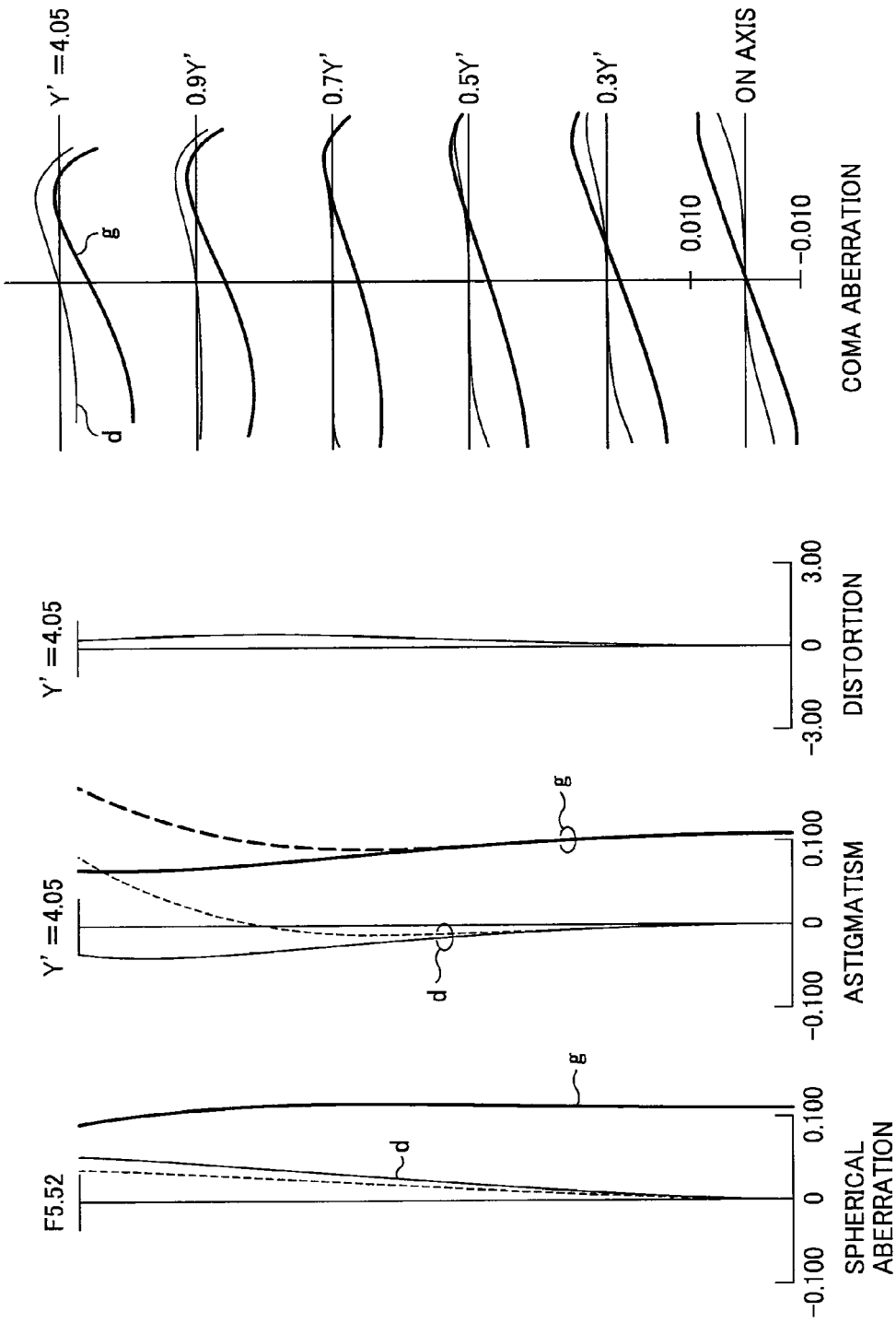
FIG. 17 is a view illustrating aberration curves at a long focus end of the zoom lens according to the fourth embodiment of the present invention.

FIGS. 15-17 are views illustrating the aberration curves of each aberration in the zoom lens illustrated in FIG. 3 according to the fourth embodiment. In this case, FIG. 15 is a view illustrating the aberration curves at the wide-angle end. FIG. 16 is a view illustrating the aberration curves at the intermediate focal length. FIG. 17 is a view illustrating the aberration curves at the telephoto end.

In each of the views, the dotted line in the spherical aberration view denotes the sine condition, and the solid line in the astigmatism view denotes the sagittal and the dotted line in the astigmatism view denotes the meridional.

According to the views in FIGS. 15-17, it can be seen that the aberrations are preferably corrected or controlled by the zoom lens illustrated in FIG. 4 according to the fourth embodiment of the present invention.

Consequently, a downsized zoom lens can be provided having the four groups of positive, negative, positive and positive, which can preferably correct aberrations, a sufficient wide-angle whose half field angle at the wide-angle end is 38 degrees or more, a magnification ratio of 6.5 times or more, about 10 lenses which are a small number of lenses, and a resolution corresponding to an imaging element of 7 to 10 million pixels.

By using such a zoom lens, a downsized camera and a downsized personal digital assistant device, which can provide a high quality image, and has a variable magnification range capable of sufficiently covering a normal photographing range, can be achieved.

Fifth Embodiment

FIG. 5 is a sectional view illustrating the structure of the optical system of the zoom lens according to the fifth embodiment of the present invention.

In FIG. 5, the top part, and the intermediate part and the lower part illustrate the structures of the optical system of the zoom lens at the wide-angle end, the intermediate focal length, and the telephoto end, respectively.

The zoom lens illustrated in FIG. 5 includes, in order from the object side, the first lens L1, the second lens L2, the third lens L3, the fourth lens L4, the fifth lens L5, the sixth lens L6, the aperture stop S, the seventh lens L7, the eighth lens L8, the ninth lens L9, the tenth lens L10, the eleventh lens L11, and the optical filter OF. An image is focused on the back of the optical filter OF having various optical filtering functions. In this case, the first to third lenses L1-L3 constitute the first lens group G1, the fourth to sixth lenses L4-L6 constitute the second lens group G2, the seventh to ninth lenses L7-L9 constitute the third lens group G3, and the tenth lens L10 constitutes the fourth lens group G4. Each of the lens groups is appropriately supported by a supporting frame and each of the lens groups moves together in zooming.

The first lens L1 is a negative meniscus lens having a convex face on the object side, the second lens L2 is a positive meniscus lens having a large curvature face on the object side, the third lens L3 is a positive meniscus lens having a large curvature face on the object side. In this case, the first and second lenses L1, L2 are cemented as a cemented lens. The first lens group G1 having the first to third lenses L1-L3 has a positive focal length, i.e., positive refractive power as a whole. The fourth lens L4 is a negative meniscus lens having a convex face on the object side, the fifth lens L5 is a biconvex lens having a large curvature face on the image side, the sixth lens L6 is a negative meniscus lens having a convex face on the image side. The fifth and sixth lenses L5, L6 are cemented as a cemented lens. The second lens group G2 having the fourth to sixth lens L4-L6 has a negative focal length, i.e., negative refractive power as a whole. Reference number S denotes the aperture stop which moves in zooming.

The seventh lens L7 is a biconvex lens having a large curvature face on the object side, the eighth lens L8 is a biconvex lens having a large curvature face on the image side, the ninth lens L9 is a biconcave lens having a large curvature face on the image side. The eight and ninth lenses L8, L9 are cemented. The third lens group G3 having the seventh to ninth lenses L7-L9 has a positive focal length, i.e., positive refractive power as a whole.

The tenth lens L10 is a biconvex lens having a large curvature face on the object side. The fourth lens group G4 consists of the tenth lens L10 having a positive focal length, i.e., positive refractive power.

The eleventh lens L11 is a negative meniscus lens having a large curvature face on the object side. The fifth lens group G5 consists of the eleventh lens L11 having a negative focal length, i.e., negative refractive power.

When varying a magnification of a focal length from the wide-angle end (short focal length) to the telephoto end (long focal length), the first lens group G1 and the third lens group G3 move to be located on the object at the telephoto end rather than at the wide-angle end, such that the distance between the first lens group G1 and the second lens group G2 increases, the distance between the second lens group G2 and the third lens group G3 decreases, and the distance between the third lens group G3 and the fourth lens group G4 increases.

The focusing can be conducted by the movement of the fourth lens group G4 or the second lens group G2, or the movement of the light-receiving element.

The optical filter OF having a parallel plate disposed closest to the image side is a filter such as a liquid crystal low-pass filter and an infrared cut filter.

By the movement of each of the lens groups G1-G4 associated with the change in the focal length, a variable distance between each lens group, more particularly, a distance DA between the face closet to the image side in the first lens group G1, i.e., the image side face (face number R5) of the third lens L3 and the face (face number R6) closest to the object side in the second lens group G2, a distance DB between the face closest to the image side in the second lens group G2, i.e., the image side face (face number R10) of the sixth lens L6 and the aperture stop S, a distance DC between the aperture stop S and the face (face number R12) closest to the object side in the third lens group G3, a distance DD between the face closest to the image side in the third lens group G3, i.e., the image side face (face number R16) of the ninth lens L9 and the face closest to the object side in the fourth lens group G4, i.e., the image side face (face number R17) of the tenth lens L10, and a distance DE between the face closest to the image side in the fourth lens group G4, i.e., the image side face (face number R18) of the tenth lens L10 and the object side face (face number R19) of the fifth lens group G5 are changed.

In this fifth embodiment, associated with the change in the focal length from the wide-angle end to the telepholo end, a focal length of the entire system f, F-number, and a half field angle ω are changed as follows.
 f: 5.16-35.10
 F-number: 3.51-5.52
 ω: 39.31-6.56

The characteristics of each optical surface are as shown in the following table (Table 9).

The optical faces of the fourth, sixth, tenth, twelfth, thirteenth and seventeenth surfaces attached with "*" in Table 9 are aspherical surfaces. The parameters according to the above-described expression illustrating the shape of each aspherical surface are as follows.

Aspherical Surface: Fourth Face $K=0.0$ $A_4=-1.05372 \times 10^{-7}$ $A_6=-1.08491 \times 10^{-8}$ $A_8=1.01529 \times 10^{-10}$ $A_{10}=-4.57835 \times 10^{-13}$ Aspherical Surface: Sixth Face $K=0.0$ $A_4=-1.48758 \times 10^{-5}$ $A_6=8.67499 \times 10^{-7}$ $A_8=-5.63699 \times 10^{-8}$ $A_{10}=6.10824 \times 10^{-10}$ Aspherical Surface: Tenth Face $K=0.0$ $A_4=-4.33693 \times 10^{-4}$ $A_6=-2.85998 \times 10^{-6}$ $A_8=-2.00782 \times 10^{-7}$ $A_{10}=-3.42078 \times 10^{-8}$

TABLE 9

NUMERICAL EMBODIMENT 5
f = 5.16~35.13, F = 3.49~4.86, ω = 39.30~6.43

| FACE NUMBER | R | D | Nd | vd | Δθg, F | GLASS NAME |
|---|---|---|---|---|---|---|
| 01 | 47.819 | 1.00 | 1.92286 | 18.90 | 0.0386 | OHARA S-NPH2 |
| 02 | 28.193 | 2.84 | 1.60300 | 65.44 | 0.0045 | OHARA S-PIM53 |
| 03 | 578.939 | 0.10 | | | | |
| 04* | 18.509 | 2.68 | 1.77250 | 49.60 | −0.0092 | OHARA S-LAH66 |
| 05 | 47.550 | VARIABLE (DA) | | | | |
| 06* | 34.982 | 0.74 | 1.88300 | 40.76 | −0.0088 | OHARA S-LAH58 |
| 07 | 4.454 | 2.38 | | | | |
| 08 | 55.525 | 2.11 | 1.92286 | 18.90 | 0.0386 | OHARA S-NPH2 |
| 09 | −9.444 | 0.64 | 2.00330 | 28.27 | 0.0023 | OHARA S-LAH79 |
| 10* | −171.344 | VARIABLE (DB) | | | | |
| 11 | APERTURE STOP | VARIABLE (DC) | | | | |
| 12* | 7.090 | 3.30 | 1.58913 | 61.15 | −0.0043 | OHARA L-BAL35 |
| 13* | −9.672 | 0.10 | | | | |
| 14 | 14.020 | 2.14 | 1.61800 | 63.33 | 0.0051 | OHARA S-PHM52 |
| 15 | −9.921 | 0.60 | 1.69895 | 30.13 | 0.0103 | OHARA S-TIM35 |
| 16 | 5.321 | VARIABLE (DD) | | | | |
| 17* | 11.278 | 2.26 | 1.52470 | 56.20 | | OPTICAL PLASTIC |
| 18 | −26.355 | VARIABLE (DE) | | | | |
| 19 | −14.657 | 1.00 | 1.83481 | 42.71 | −0.0082 | OHARA S-LAH55 |
| 20 | −23.431 | 1.74 | | | | |
| 21 | ∞ | 0.80 | 1.51680 | 64.20 | | VARIOUS FILTERS |
| 22 | ∞ | | | | | |

Aspherical Surface: Twelfth Face

K=0.0

$A_4 = -7.73201 \times 10^{-4}$ $A_6 = 4.83062 \times 10^{-6}$ $A_8 = -2.60149 \times 10^{-7}$ $A_{10} = -3.28255 \times 10^{-8}$ Aspherical Surface: Thirteenth Face

K=0.0

$A_4 = 2.36156 \times 10^{-4}$ $A_6 = 2.50539 \times 10^{-5}$ $A_8 = -2.77879 \times 10^{-8}$ $A_{10} = -3.56150 \times 10^{-8}$ Aspherical Surface: Seventeenth Face

K=0.0

$A_4 = -8.58174 \times 10^{-5}$ $A_6 = 7.68289 \times 10^{-6}$ $A_8 = -3.48643 \times 10^{-7}$ $A_{10} = 6.55382 \times 10^{-9}$ The variable distance DA between the first lens group G1 and the second lens group G2, the variable distance DB between the second lens group G2 and the aperture stop S, the variable distance DC between the aperture stop S and the third lens group G3, the variable distance DD between the third lens group G3 and the fourth lens group G4, and the variable distance DE between the fourth lens group G4 and the fifth lens group G5 are changed with the zooming as the following table (Table 10).

TABLE 10

| | VARIABLE INTERVAL | | |
|---|---|---|---|
| | SHORT FOCUS END f = 5.157 | INTERMEDIATE FOCAL LENGTH f = 13.395 | LONG FOCUS END f = 35.127 |
| DA | 0.600 | 8.629 | 15.020 |
| DB | 8.204 | 2.954 | 0.900 |
| DC | 4.788 | 2.437 | 0.650 |
| DD | 2.000 | 3.256 | 9.992 |
| DE | 2.791 | 4.606 | 2.620 |

The values of the parameters according to the above-described conditional expressions in the fifth embodiment are as follows.

Conditional Expression Values $v_d, \Delta\theta_{g,F}$: as described in Table 9

$f_{ap}/f_W = 9.51$ $L_{a1-a2}W/L_{a1-s}W = 0.527$ $L_{a1-a2}T/L_{a1-s}T = 0.963$ $L_{s-a3}W/L_{a1-s}W = 0.276$ $L_{s-a3}T/L_{a1-s}T = 0.027$ $|r_{3R}|/f_W = 1.032$ $X_1/f_T = 0.307$ $X_3/f_T = 0.223$ $|f_2|/f_3 = 0.624$ $f_1/f_W = 5.86$ $d_{SW}/f_T = 0.136$

Accordingly, the values of the parameters according to the above-described conditional expressions in the fifth embodiment 5 are within the conditional expression ranges.

Figure 18:
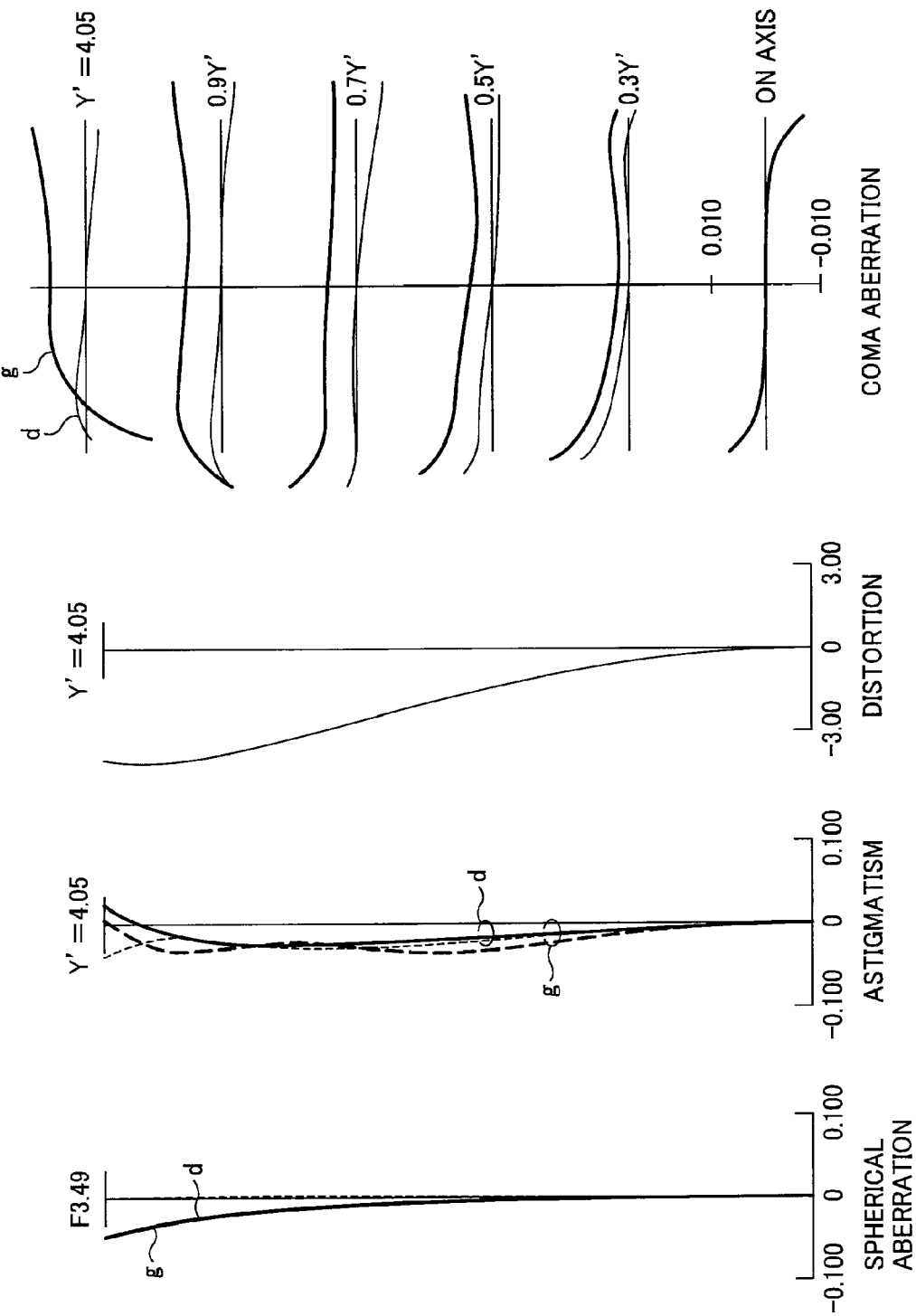
FIG. 18 is a view illustrating aberration curves at a short focus end of the zoom lens according to the fifth embodiment of the present invention.
Figure 19:
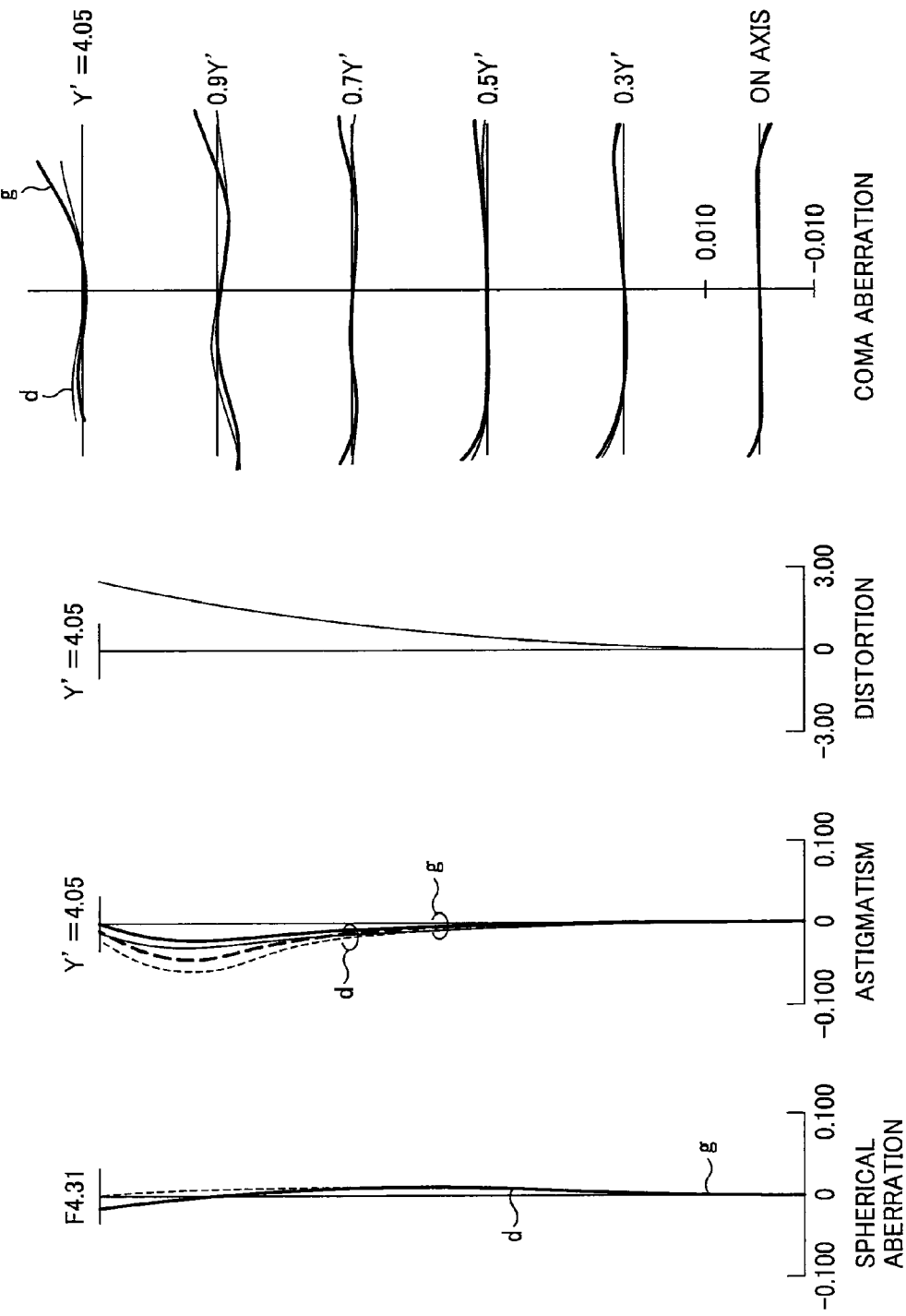
FIG. 19 is a view illustrating aberration curves in an intermediate focal length of the zoom lens according to the fifth embodiment of the present invention.
Figure 20:
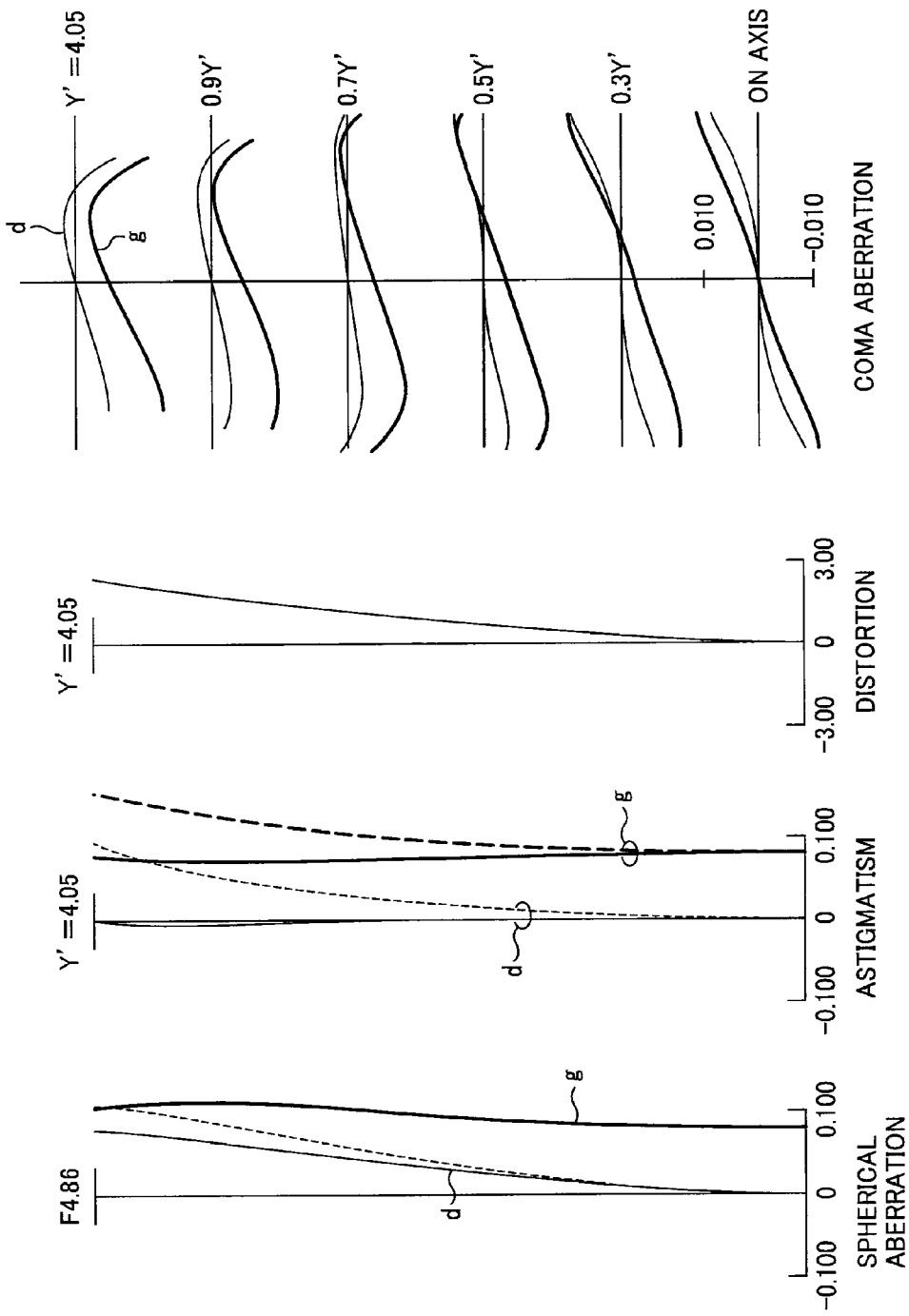
FIG. 20 is a view illustrating aberration curves at a long focus end of the zoom lens according to the fifth embodiment of the present invention.

FIGS. 18-20 are views illustrating the aberration curves of each aberration in the zoom lens illustrated in FIG. 5 according to the fifth embodiment 5. In this case, FIG. 18 is a view illustrating the aberration curves at the wide-angle end. FIG. 19 is a view illustrating the aberration curves at the intermediate focal length. FIG. 20 is a view illustrating the aberration curves at the telephoto end.

In each of the views, the dotted line in the spherical aberration view denotes the sine condition, and the solid line in the astigmatism view denotes the sagittal and the dotted line in the astigmatism view denotes the meridional.

According to the views in FIGS. 18-20, it can be seen that the aberrations are preferably corrected or controlled by the zoom lens illustrated in FIG. 5 according to the fifth embodiment of the present invention.

Consequently, a downsized zoom lens can be provided having the five groups of positive, negative, positive, positive, and negative, which can preferably correct aberrations, a sufficient wide-angle whose half field angle at the wide-angle end is 38 degrees or more, a magnification ratio of 6.5 times or more, about 11 lenses which are a small number of lenses, and a resolution corresponding to an imaging element of 7 to 10 million pixels.

By using such a zoom lens, a downsized camera and a downsized personal digital assistant device, which can provide a high quality image, and has a variable magnification range capable of sufficiently covering a normal photographing range, can be achieved.

Figure 21A:
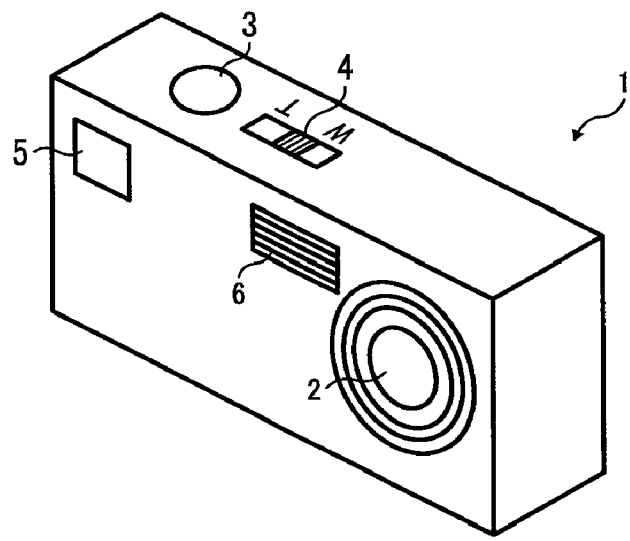
Figure 21B:
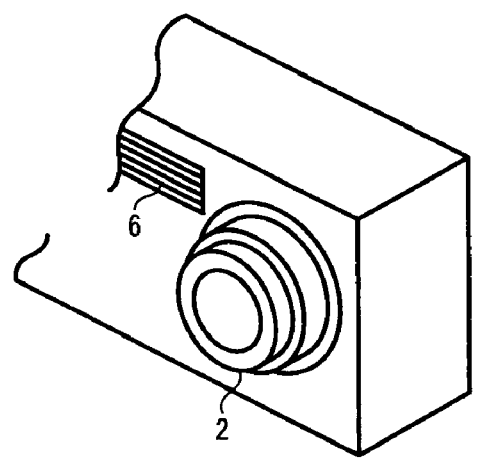
Figure 21C:
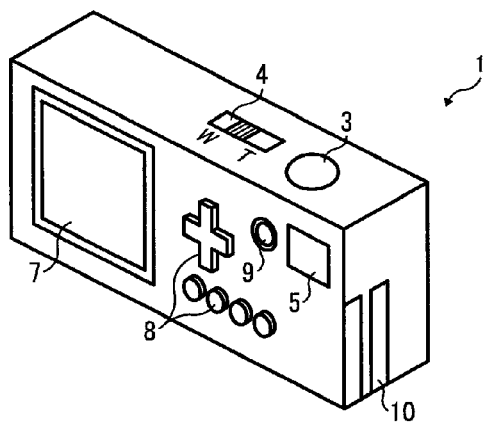
Figure 22:
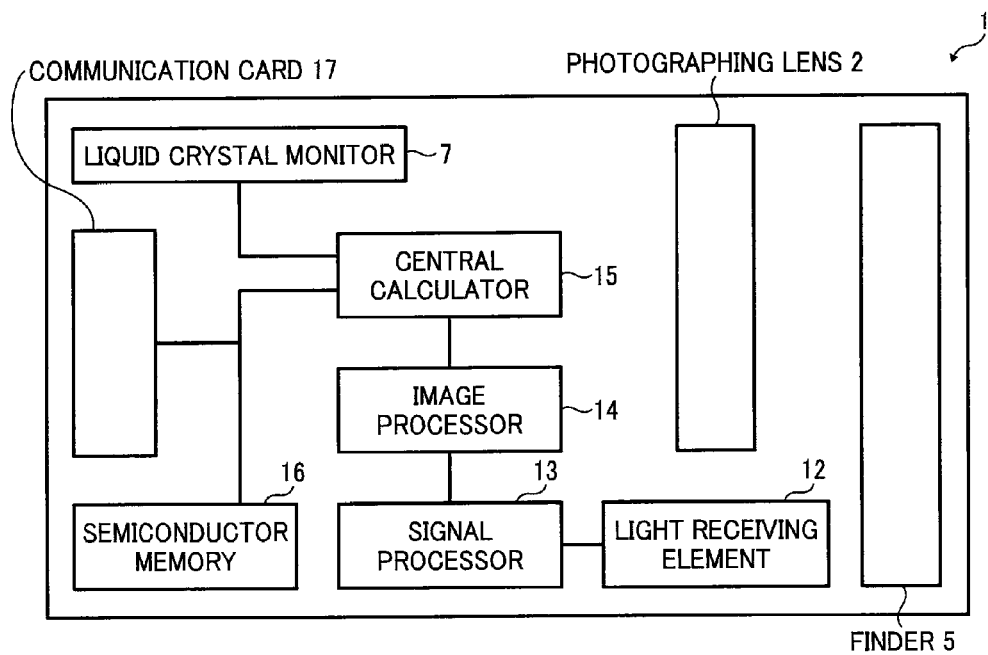
FIG. 22 is a block diagram illustrating a system structure of a camera device.

Next, an embodiment of the present invention in which a camera (including a personal digital assistant device) includes a photographing optical system as a zoom lens according to the present invention illustrated in the first to fifth embodiments will be described with reference to FIGS. 21-22. FIG. 21A is a perspective front view illustrating an outer appearance of a camera in a collapsed state. FIG. 21B is a perspective front view illustrating a part of the outer appearance structure in a usage state of a camera. FIG 21C is a perspective back view illustrating an outer appearance of the camera. FIG. 22 is a block diagram illustrating a functional structure of the camera. In this case, it is described for the camera; however, a personal digital assistant device, which is provided with a camera function, such as a so-called PDA (personal digital assistant) and a cellular phone, has recently become popular. The external appearance of such a personal digital assistant device includes functions and structures substantially similar to the functions and structures of the camera, and the photographing optical system or the camera according to the present invention can be adapted to such a personal digital assistant device.

As illustrated in FIGS. 21A, 21B, 21C, the camera 1 includes a photographing lens 2, a shutter button 3, a zoom lever 4, a finder 5, a strobe light 6, a liquid crystal monitor 7, operational buttons 8, a power source switch 9, and a memory/communication card slot 10. As illustrated in FIG. 22, the camera 1 includes a light receiving element 12, a signal processor 13, an image processor 14, a central calculator (CPU) 15, a semiconductor memory 16 and a communication card 17.

The camera 1 includes the photographing lens 2 as a photographing optical system and the light-receiving element 12 as an area sensor such as a CCD (charge-coupled device) imaging element. In the camera 1, an image of a subject formed by the photographing lens 2 of the photographing optical system is read by means of the light-receiving element 12. As this photographing lens 2, the photographing optical system as described in the first to fifth embodiments according to the present invention is used. Specifically, a lens unit is constituted by using lenses or the like, which are the optical elements constituting the photographing optical system as the zoom lens. This lens unit has a function of retaining each lens such that each lens is at least moved by each lens group. The photographing lens 2 is normally incorporated into the camera in the form of the lens unit.

The output of the light-receiving element 12 is processed by the signal processor 13 which is controlled by the central calculator 15, and is converted into digital image information. The image information digitized by the signal processor 13 is recorded into the semiconductor memory 16 such as a non-volatile memory after a predetermined image process is conducted in the image processor 14 which is controlled by the central calculator 15. In this case, this semiconductor memory 16 can be a memory card equipped in the memory/communication card slot 10, or can be a semiconductor memory built in the body of the camera. The liquid crystal monitor 7 can display an image in photographing and also display an image recorded in the semiconductor memory 16. The image recorded in the semiconductor memory 16 can be send to an external device via the communication card 17 or the like equipped in the memory/communication slot 10.

As illustrated in FIG. 21A, when the camera 1 is carried, the photographing lens 2 is in a collapsed state and is provided inside the body of the camera 1. When a user operates the power source switch 9, the lens barrel is extended as illustrated in FIG. 21B, and projects from the body of the camera 1. In this case, in the lens barrel of the photographing lens 2, the optical system of each group constituting the zoom lens is arranged at the wide-angle end, for example. By the operation of the zoom lever 4, the arrangement of the each group is changed, and a magnification can be varied to the telephoto end. In addition, it is preferable for the optical system of the finder 5 to vary a magnification together with the change in the field angle of the photographing lens 2.

In many cases, by the half-pressing operation of the shutter button 3, the focusing is conducted. If the shutter button 3 is further pressed, i.e., fully pressed, the photographing is conducted. After that, the above-described processes are conducted.

When displaying the image recorded in the semiconductor memory 16 on the liquid crystal monitor 7 or sending the image to the outside via the communication card 17 or the like, the operation button 8 is used. The semiconductor memory 16 and the communication card 17 are used in a dedicated slot or a general slot such as the memory/communication slot 10.

When the photographing lens 2 is in a collapsed state, it is not necessary for each group of the zoom lens to be arranged on the optical axis. As long as a plurality of optical systems is housed in parallel, the thickness in the camera can be further reduced. The above-described camera or the personal digital assistant device can use the photographing lens 2 using the zoom lens illustrated in the first to fifth embodiments as the optical system for photographing. Accordingly, the downsized camera and the downsized portable digital assistant device, which use a light receiving element having 7 to 10 million pixels and also provide a high quality image, can be achieved.

According to one embodiment of the present invention, the zoom lens includes, in order from the object to the image, the first lens group having positive refractive power, the second lens group having negative refractive power, the third lens group having positive refractive power, and the fourth lens group having positive refractive power. In such a zoom lens, when varying a field angle from the wide-angle end to the telephoto end, the first lens group and the third lens group move to the object such that the distance between the first lens group and the second lens group increases, the distance between the second lens group and the third lens group decreases, and the distance between the third lens group and the fourth lens group increases. The first lens group includes one negative lens and two positive lenses, and at least one of the negative lens and the two positive lenses of the first lens group includes an aspherical surface. The first lens group satisfies the following conditional expressions, $$\nu_d > 60.0 \tag{1}$$

$$\Delta\theta_{g,F} > 0.003 \tag{2}$$

where, $\nu_d$ is an Abbe's number of at least one positive lens in the first lens group, and $\Delta\theta_{g,F}$ is abnormal dispersion of the positive lens. In this case, the abnormal dispersion $\Delta\theta_{g,F}$ is diffraction from a standard line of glass types which is a straight standard line connecting a glass type K7 and a glass type F2 in a graph having an Abbe's number on a horizontal axis and a partial dispersion ratio $\theta_{g,F} = (n_g - n_F)/(n_F - n_C)$ on a vertical axis, and ng, $n_F$, $n_C$ are refractive indexes relative to a g line, an F line, and a C line, respectively.

Therefore, a downsized zoom lens having a sufficient wide angle whose half field angle is 38 degrees or more at the wide-angle end, a variable magnification of 6.5 times or more, a small number of lenses of about 10 lenses, and a resolution corresponding to 7-10 million pixels can be provided. Also, a camera and a personal digital assistant device using the zoom lens can be achieved.

According to one embodiment of the present invention, the aspherical surface is provided in the positive lens of the first lens group, and the positive lens provided with the aspherical surface does not satisfy the above-described conditional expressions (1), (2). Therefore, a zoom lens having a high performance can be provided with low costs, and also a camera and a personal digital assistant device capable of providing a high quality image can be achieved with lower costs.

According to one embodiment of the present invention, a focal length of the positive lens of the first lens group satisfying the above-described conditional expressions (1), (2), $f_{ap}$ and a focal length of an entire system at the wide-angle end, $f_W$ satisfy the following conditional expression, $7.0 < f_{ap}/f_W < 17.0$. Therefore, a high-performance zoom lens in which chromatic aberrations and monochromatic aberrations are corrected with a good balance can be provided. Also, a camera and a personal digital assistant device can be provided, which have a high resolution while controlling color shift of the peripheral part of the screen at the wide-angle end, bleeding over the entire screen at the telephoto end, and the like.

According to one embodiment of the present invention, the negative lens of the first lens group is a negative meniscus lens having a convex face to the object, each of the two positive lenses of the first lens group includes a face having a large curvature to the object, the negative lens is arranged in a position close to the object compared to positions of the two positive lenses, and the aspherical surface is disposed in the positive lens of the two positive lenses, which is closer to the image. Therefore, a high-performance zoom lens can be provided in which the chromatic aberrations are well corrected and a stable performance is easily obtained. Also, a camera and a personal digital assistant device capable of obtaining a preferable image without having unevenness can be achieved.

According to one embodiment of the present invention, the aperture stop is disposed between the second lens group and the third lens group, and the aperture stop moves independently of the adjacent lens groups. Therefore, a downsized and high-performance zoom lens can be provided in which the off-axis performance is improved, and also a downsized camera and a downsized personal digital assistant having a high resolution over the entire screen can be achieved.

According to one embodiment of the present invention, the aperture stop is disposed between the second lens group and the third lens group, the second lens group includes at least one aspherical surface, and the third lens group includes at least one aspherical surface. Therefore, a downsized and high-performance zoom lens in which the monochromatic aberrations are well corrected can be provided. Also, a camera and a personal digital assistant device capable of obtaining a sharper image can be achieved.

According to one embodiment of the present invention, a distance from the aspherical surface of the first lens group to the aspherical surface of the second lens group at the wide-angle end, $L_{a1-a2}W$, a distance from the aspherical surface of the first lens group to the aperture stop at the wide-angle end, $L_{a1-s}W$, a distance from the aspherical surface of the first lens group to the aspherical surface of the second lens group at the telephoto end, $L_{a1-a2}T$, and a distance from the aspherical surface of the first lens group to the aperture stop at the telephoto end, $L_{a1-s}T$ satisfy the following conditional expressions, $$0.40 < L_{a1-a2}W/L_{a1-s}W < 0.70$$

$$0.80 < L_{a1-a2}T/L_{a1-s}T < 1.00$$

where one lens group includes a plurality of aspherical surfaces, a value of the aspherical surface closest to the aperture stop is used.

Therefore, a high-performance zoom lens in which the aberrations are corrected with a good balance over the entire variable magnification area can be provided. Also, a camera and a personal digital assistant device, which can obtain a preferable image even if the photographing is conducted in any position, can be achieved.

According to one embodiment of the present invention, a distance from the aperture stop to the aspherical surface of the third lens group at the wide-angle end, $L_{a-a3}W$ and a distance from the aperture stop to the aspherical surface of the third lens group at the telephoto end, $L_{s-a3}T$ satisfy the following conditional expressions, $$0.10 < L_{a-a3}W/L_{a1-s}W < 0.40$$

$$0.00 < L_{s-a3}T/L_{a1-s}T < 0.20$$

where one lens group includes a plurality of aspherical surfaces, a value of the aspherical surface closest to the aperture stop is used.

Therefore, a high-performance zoom lens in which the aberrations are corrected with a good balance over the entire variable magnification area can be provided. Also, a camera and a personal digital assistant device, which can obtain a preferable image even if the photographing is conducted in any position, can be achieved.

According to one embodiment of the present invention, the third lens group includes two positive lenses and one negative lens. Therefore, a high-performance zoom lens in which each aberration is well corrected can be provided. Also, a camera and a personal digital assistant device having a high resolution can be achieved.

According to one embodiment of the present invention, the negative lens of the third lens group includes a strong concave face to the image, and is arranged in a position close to the image compared to positions of the two positive lenses, and a curvature radius of the face closet to the image in the third lens group, $r_{3R}$ and a focal length of an entire system at the wide-angle end, $f_W$ satisfy the following conditional expression, $$0.70 < |r_{3R}|/f_W < 1.30.$$

Therefore, a high-performance zoom lens in which each aberration is well corrected can be provided. Also, a camera and a personal digital assistant device having a high resolution can be achieved.

According to one embodiment of the present invention, the camera includes the zoom lens according to one embodiment of the present invention as a photographing optical system. Therefore, a downsized camera using as the photographing optical system and the downsized zoom lens having a sufficient wide angle whose half field angle is 38 degrees or more at the wide-angle end, a variable magnification of 6.5 times or more, a small number of lenses about 10 lenses, and a resolution corresponding to 7-10 million pixels can be provided. Thus, a user can photograph a high quality image by the camera having good portability.

According to one embodiment of the present invention, the personal digital assistant device includes the zoom lens according to one embodiment of the present invention as a photographing optical system of a camera functioning section. Therefore, a downsized portable digital assistant device using as the photographing optical system of the camera functioning section the zoom lens having a sufficient wide angle whose half field angle is 38 degrees or more at the wide-angle end, a variable magnification of 6.5 times or more, a small number of lenses of about 10 lenses, and a resolution corresponding to 7-10 million pixels can be provided. Thus, a user can photograph a high quality image by the portable digital assistant device having high portability and send the image to the exterior, In addition, the zoom lens according to the embodiment of the present invention can be used as a main element of a camera built in or externally attached to an imaging lens device for optically loading a subject image by means of an optical system and optically outputting as electric signals by means of an imaging element, for example, a digital camera, a video camera, a personal computer, a mobile computer, a cell-phone, and a PDA (personal digital assistant), and also can be used for a silver salt camera.

Although the present invention has been described in terms of exemplary embodiments, it is not limited thereto. It should be appreciated that variations may be made in the embodiments described by persons skilled in the art without departing from the scope of the present invention as defined by the following claims.

What is claimed is:

1. A zoom lens, comprising, in order from an object to an image:
   a first lens group having positive refractive power;
   a second lens group having negative refractive power;
   a third lens group having positive refractive power; and
   a fourth lens group having positive refractive power;

when varying a field angle from a wide-angle end to a telephoto end, the first lens group and the third lens group being moved to be located on the object side at the telephoto end rather than at the wide-angle end such that a distance between the first lens group and the second lens group increases, a distance between the second lens group and the third lens group decreases, and a distance between the third lens group and the fourth lens group increases, the first lens group including one negative lens and two positive lenses, at least one of the negative lens and the two positive lenses of the first lens group including an aspherical surface, and the first lens group satisfying the following conditional expressions, $$\nu_d > 60.0$$

$$\Delta\theta_{g,F} > 0.003$$

where, $\nu_d$ is an Abbe's number of at least one positive lens in the first lens group, and $\Delta\theta_{g,F}$ is abnormal dispersion of the positive lens, the abnormal dispersion $\Delta\theta_{g,F}$ is diffraction from a standard line of glass types which is a straight standard line connecting a glass type K7 and a glass type F2 in a graph having an Abbe's number on a horizontal axis and a partial dispersion ratio $\theta_{g,F} = (n_g - n_F)/(n_F - n_C)$ on a vertical axis, and ng, $n_F$, $n_C$ are refractive indexes relative to a g line, an F line, and a C line, respectively.

2. The zoom lens according to claim 1, wherein the aspherical surface is provided in the positive lens of the first lens group, and the positive lens provided with the aspherical surface does not satisfy the conditional expressions set forth in claim 1.

3. The zoom lens according to claim 2, wherein a focal length of the positive lens of the first lens group satisfying the conditional expressions set forth in claim 1, $f_{ap}$ and a focal length of an entire system at the wide-angle end, $f_W$ satisfy the following conditional expression, $$7.0 < f_{ap}/f_W < 17.0.$$

4. The zoom lens according to claim 1, wherein the negative lens of the first lens group is a negative meniscus lens having a convex face to the object, each of the two positive lenses of the first lens group includes a face having a large curvature to the object, the negative lens is arranged in a position close to the object compared to positions of the two positive lenses, and the aspherical surface is disposed in one of the two positive lens, which is close to the image.

5. The zoom lens according to claim 1, wherein an aperture stop is disposed between the second lens group and the third lens group, and the aperture stop moves independently of the adjacent lens groups.

6. The zoom lens according to claim 1, wherein an aperture stop is disposed between the second lens group and the third lens group, the second lens group includes at least one aspherical surface, and the third lens group includes at least one aspherical surface, 7. The zoom lens according to claim 6, wherein a distance from the aspherical surface of the first lens group to the aspherical surface of the second lens group at the wide-angle end, $L_{a1-a2}W$, a distance from the aspherical surface of the first lens group to the aperture stop at the wide-angle end, $L_{a1-s}W$, a distance from the aspherical surface of the first lens group to the aspherical surface of the second lens group at the telephoto end, $L_{a1-a2}T$, and a distance from the aspherical surface of the first lens group to the aperture stop at the telephoto end, $L_{a1-s}T$, satisfy the following conditional expressions, $$0.40 < L_{a1-a2}W/L_{a1-s}W < 0.70$$

$$0.80 < L_{a1-a2}T/L_{a1-s}T < 1.00$$

where one lens group includes a plurality of aspherical surfaces, a value of the aspherical surface closest to the aperture stop is used.

8. The zoom lens according to claim 6, wherein a distance from the aperture stop to the aspherical surface of the third lens group at the wide-angle end, $L_{s-a3}W$, a distance from the aperture stop to the aspherical surface of the third lens group at the telephoto end, $L_{s-a3}T$, a distance from the aspherical surface of the first lens group to the aperture stop at the wide-angle end, $L_{a1-s}W$, and a distance from the aspherical surface of the first lens group to the aperture stop at the telephoto end, $L_{a1-s}T$, satisfy the following conditional expressions, $$0.10 < L_{s-a3}W/L_{a1-s}W < 0.40$$

$$0.00 < L_{s-a3}T/L_{a1-s}T < 0.20$$

where one lens group includes a plurality of aspherical surfaces, a value of the aspherical surface closest to the aperture stop is used.

9. The zoom lens according to claim 1, wherein the third lens group includes two positive lenses and one negative lens.

10. The zoom lens according to claim 9, wherein the negative lens of the third lens group includes a strong concave face to the image, and is arranged in a position close to the image compared to positions of the two positive lenses, and a curvature radius of the face closest to the image in the third lens group, $r_{3R}$ and a focal length of an entire system at the wide-angle end, $f_W$ satisfy the following conditional expression, $$0.70 < |r_{3R}|/f_W < 1.30.$$

11. A camera comprising the zoom lens according to claim 1 as a photographing optical system.

12. A personal digital assistant device comprising the zoom lens according to claim 1 as a photographing optical system of a camera functioning section.

* * * * *